(12) United States Patent
Li et al.

(10) Patent No.: US 11,528,075 B2
(45) Date of Patent: Dec. 13, 2022

(54) JOINT BEAM MANAGEMENT FOR BACKHAUL LINKS AND ACCESS LINKS

(71) Applicant: QUALCOMM Incorporated, San Diego, CA (US)

(72) Inventors: Junyi Li, Chester, NJ (US); Navid Abedini, Somerset, NJ (US); Raju Hormis, New York, NY (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/930,331

(22) Filed: May 12, 2020

(65) Prior Publication Data

US 2020/0366363 A1 Nov. 19, 2020

Related U.S. Application Data

(60) Provisional application No. 62/848,929, filed on May 16, 2019.

(51) Int. Cl.
*H04B 7/155* (2006.01)
*H04B 7/06* (2006.01)
(Continued)

(52) U.S. Cl.
CPC ....... *H04B 7/15592* (2013.01); *H04B 7/0695* (2013.01); *H04L 5/0051* (2013.01);
(Continued)

(58) Field of Classification Search
CPC .............. H04B 7/15592; H04B 7/0695; H04B 7/15542; H04B 7/1555; H04B 7/18532;
(Continued)

(56) References Cited

U.S. PATENT DOCUMENTS

2015/0004918 A1* 1/2015 Wang ................ H04W 36/0079
455/73
2015/0078193 A1 3/2015 Kwon et al.
(Continued)

OTHER PUBLICATIONS

Co-Pending U.S. Appl. No. 16/795,155, filed Feb. 19, 2020.
(Continued)

*Primary Examiner* — Thai Nguyen
(74) *Attorney, Agent, or Firm* — Harrity & Harrity LLP/Qualcomm Incorporated

(57) ABSTRACT

In some aspects, a base station may transmit a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node. The base station may identify a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node. Numerous other aspects are provided.

30 Claims, 13 Drawing Sheets

600 ⟶

(51) Int. Cl.
*H04W 76/27* (2018.01)
*H04W 24/10* (2009.01)
*H04W 74/08* (2009.01)
*H04L 5/00* (2006.01)

(52) U.S. Cl.
CPC ....... *H04W 24/10* (2013.01); *H04W 74/0833* (2013.01); *H04W 76/27* (2018.02)

(58) Field of Classification Search
CPC ................ H04W 76/27; H04W 24/10; H04W 74/0833; H04L 5/0051; H04L 5/0048; H04L 5/0094; H04L 5/003
See application file for complete search history.

(56) References Cited

U.S. PATENT DOCUMENTS

| | | | |
|---|---|---|---|
| 2016/0007371 A1* | 1/2016 | Pietraski | H04W 72/1289 370/315 |
| 2016/0198474 A1* | 7/2016 | Raghavan | H04W 72/0466 370/335 |
| 2017/0230893 A1 | 8/2017 | Miao et al. | |
| 2019/0181943 A1 | 6/2019 | Liang et al. | |
| 2019/0222995 A1* | 7/2019 | Abouelseoud | H04W 16/28 |

OTHER PUBLICATIONS

Co-Pending U.S. Appl. No. 16/795,169, filed Feb. 19, 2020.
Co-Pending U.S. Appl. No. 16/703,390, filed Dec. 4, 2019.
Co-Pending U.S. Appl. No. 16/789,349, filed Feb. 12, 2020.
Co-Pending U.S. Appl. No. 16/824,217, filed Mar. 20, 2020.
International Search Report and Wrtten Opinion—PCT/US2020/032642—ISA/EPO—dated Aug. 24, 2020.

* cited by examiner

JOINT BEAM MANAGEMENT FOR BACKHAUL LINKS AND ACCESS LINKS

CROSS-REFERENCE TO RELATED APPLICATION

This Patent Application claims priority to U.S. Provisional Patent Application No. 62/848,929, filed on May 16, 2019, entitled "JOINT BEAM MANAGEMENT FOR BACKHAUL LINKS AND ACCESS LINKS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for joint beam management for backhaul links and access links.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists further improvements in LTE and NR technologies remain useful. Preferably, these improvements should be applicable to other multiple access technologies and the telecommunication standards that employ these technologies.

SUMMARY

In some aspects, a method of wireless communication, performed by a base station, may include transmitting a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; and identifying a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node.

In some aspects, a method of wireless communication, performed by a millimeter wave repeater, may include receiving a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; receiving the one or more reference signals via the first set of resources according to the configuration; and relaying the one or more reference signals via the second set of resources according to the configuration.

In some aspects, a method of wireless communication, performed by a node, may include receiving a configuration that indicates a first resource set and a second resource set for beam management, wherein the first resource set is configured for beam management for a direct link between the node and a base station and the second resource set is configured for beam management for an indirect link between the node and the base station via a millimeter wave repeater; determining whether the node is communicating with the base station via the direct link or via the indirect link; and using one of the first resource set or the second resource set for a beam management procedure based at least in part on determining whether the node is communicating with the base station via the direct link or via the indirect link.

In some aspects, a method of wireless communication, performed by a base station, may include transmitting a configuration that indicates a first resource set and a second resource set for beam management, wherein the first resource set is configured for beam management for a direct link between a node and the base station and the second resource set is configured for beam management for an indirect link between the node and the base station via a millimeter wave repeater; using the first resource set to perform a first beam management procedure with a first node that has a direct link with the base station; and using the second resource set to perform a second beam management procedure with a second node that has an indirect link with the base station via a millimeter wave repeater.

In some aspects, a base station for wireless communication may include memory and one or more processors operatively coupled to the memory. The memory and the one or more processors may be configured to transmit a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; and identify a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node.

In some aspects, a millimeter wave repeater for wireless communication may include memory and one or more processors operatively coupled to the memory. The memory and the one or more processors may be configured to receive a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; receive the one or more reference signals via the first set of resources according to the configuration; and relay the one or more reference signals via the second set of resources according to the configuration.

In some aspects, a node for wireless communication may include memory and one or more processors operatively coupled to the memory. The memory and the one or more processors may be configured to receive a configuration that indicates a first resource set and a second resource set for beam management, wherein the first resource set is configured for beam management for a direct link between the node and a base station and the second resource set is configured for beam management for an indirect link between the node and the base station via a millimeter wave repeater; determine whether the node is communicating with the base station via the direct link or via the indirect link; and use one of the first resource set or the second resource set for a beam management procedure based at least in part on determining whether the node is communicating with the base station via the direct link or via the indirect link.

In some aspects, a base station for wireless communication may include memory and one or more processors operatively coupled to the memory. The memory and the one or more processors may be configured to transmit a configuration that indicates a first resource set and a second resource set for beam management, wherein the first resource set is configured for beam management for a direct link between a node and the base station and the second resource set is configured for beam management for an indirect link between the node and the base station via a millimeter wave repeater; use the first resource set to perform a first beam management procedure with a first node that has a direct link with the base station; and use the second resource set to perform a second beam management procedure with a second node that has an indirect link with the base station via a millimeter wave repeater.

In some aspects, a non-transitory computer-readable medium may store one or more instructions for wireless communication. The one or more instructions, when executed by one or more processors of a base station, may cause the one or more processors to: transmit a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; and identify a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node.

In some aspects, a non-transitory computer-readable medium may store one or more instructions for wireless communication. The one or more instructions, when executed by one or more processors of a millimeter wave repeater, may cause the one or more processors to: receive a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; receive the one or more reference signals via the first set of resources according to the configuration; and relay the one or more reference signals via the second set of resources according to the configuration.

In some aspects, a non-transitory computer-readable medium may store one or more instructions for wireless communication. The one or more instructions, when executed by one or more processors of a node, may cause the one or more processors to: receive a configuration that indicates a first resource set and a second resource set for beam management, wherein the first resource set is configured for beam management for a direct link between the node and a base station and the second resource set is configured for beam management for an indirect link between the node and the base station via a millimeter wave repeater; determine whether the node is communicating with the base station via the direct link or via the indirect link; and use one of the first resource set or the second resource set for a beam management procedure based at least in part on determining whether the node is communicating with the base station via the direct link or via the indirect link.

In some aspects, a non-transitory computer-readable medium may store one or more instructions for wireless communication. The one or more instructions, when executed by one or more processors of a base station, may cause the one or more processors to: transmit a configuration that indicates a first resource set and a second resource set for beam management, wherein the first resource set is configured for beam management for a direct link between a node and the base station and the second resource set is configured for beam management for an indirect link between the node and the base station via a millimeter wave repeater; use the first resource set to perform a first beam management procedure with a first node that has a direct link with the base station; and use the second resource set to perform a second beam management procedure with a second node that has an indirect link with the base station via a millimeter wave repeater.

In some aspects, an apparatus (e.g., a base station) for wireless communication may include means for transmitting a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; and means for identifying a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node.

In some aspects, an apparatus (e.g., a millimeter wave repeater) for wireless communication may include means for receiving a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node; means for receiving the one or more reference signals via the first set of resources according to the configuration; and means for relaying the one or more reference signals via the second set of resources according to the configuration.

In some aspects, an apparatus (e.g., a node) for wireless communication may include means for receiving a configuration that indicates a first resource set and a second resource set for beam management, wherein the first resource set is configured for beam management for a direct link between the node and a base station and the second resource set is configured for beam management for an indirect link between the node and the base station via a millimeter wave repeater; means for determining whether the node is communicating with the base station via the direct link or via the indirect link; and means for using one of the first resource set or the second resource set for a beam management procedure based at least in part on determining whether the node is communicating with the base station via the direct link or via the indirect link.

In some aspects, an apparatus (e.g., a base station) for wireless communication may include means for transmitting a configuration that indicates a first resource set and a second resource set for beam management, wherein the first resource set is configured for beam management for a direct link between a node and the base station and the second resource set is configured for beam management for an indirect link between the node and the base station via a millimeter wave repeater; means for using the first resource set to perform a first beam management procedure with a first node that has a direct link with the base station; and means for using the second resource set to perform a second beam management procedure with a second node that has an indirect link with the base station via a millimeter wave repeater.

Aspects generally include a method, apparatus, system, computer program product, non-transitory computer-readable medium, user equipment, base station, millimeter wave repeater, node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
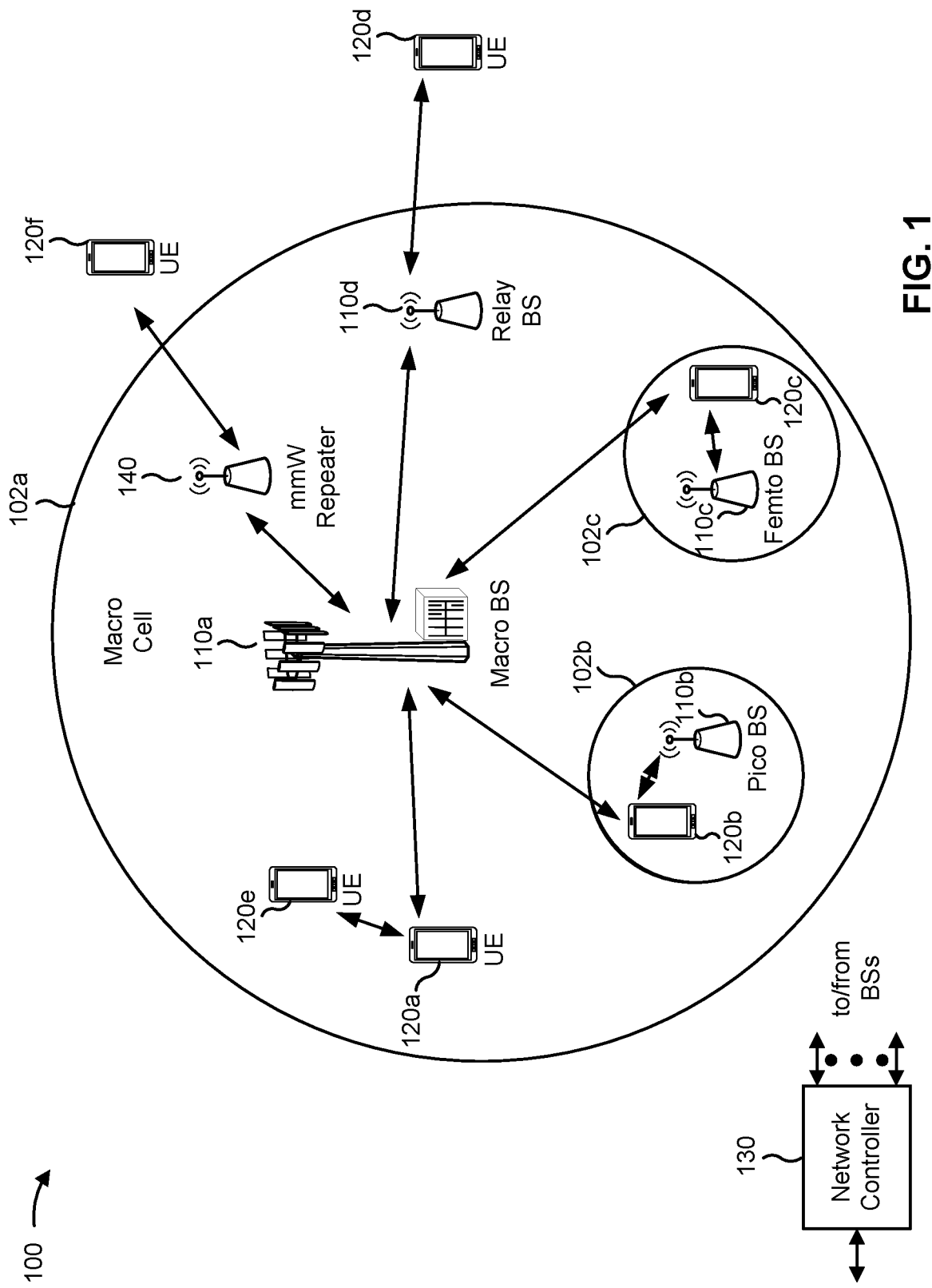
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a millimeter wave (mmW) repeater 140 may receive a millimeter wave signal (e.g., an analog millimeter wave signal) from a base station 110, may amplify the millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer 1 mmW repeater. Additionally, or alternatively, the mmW repeater 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As indicated above, FIG. 1 is provided as an example. Other examples may differ from what is described with regard to FIG. 1.

Figure 2:
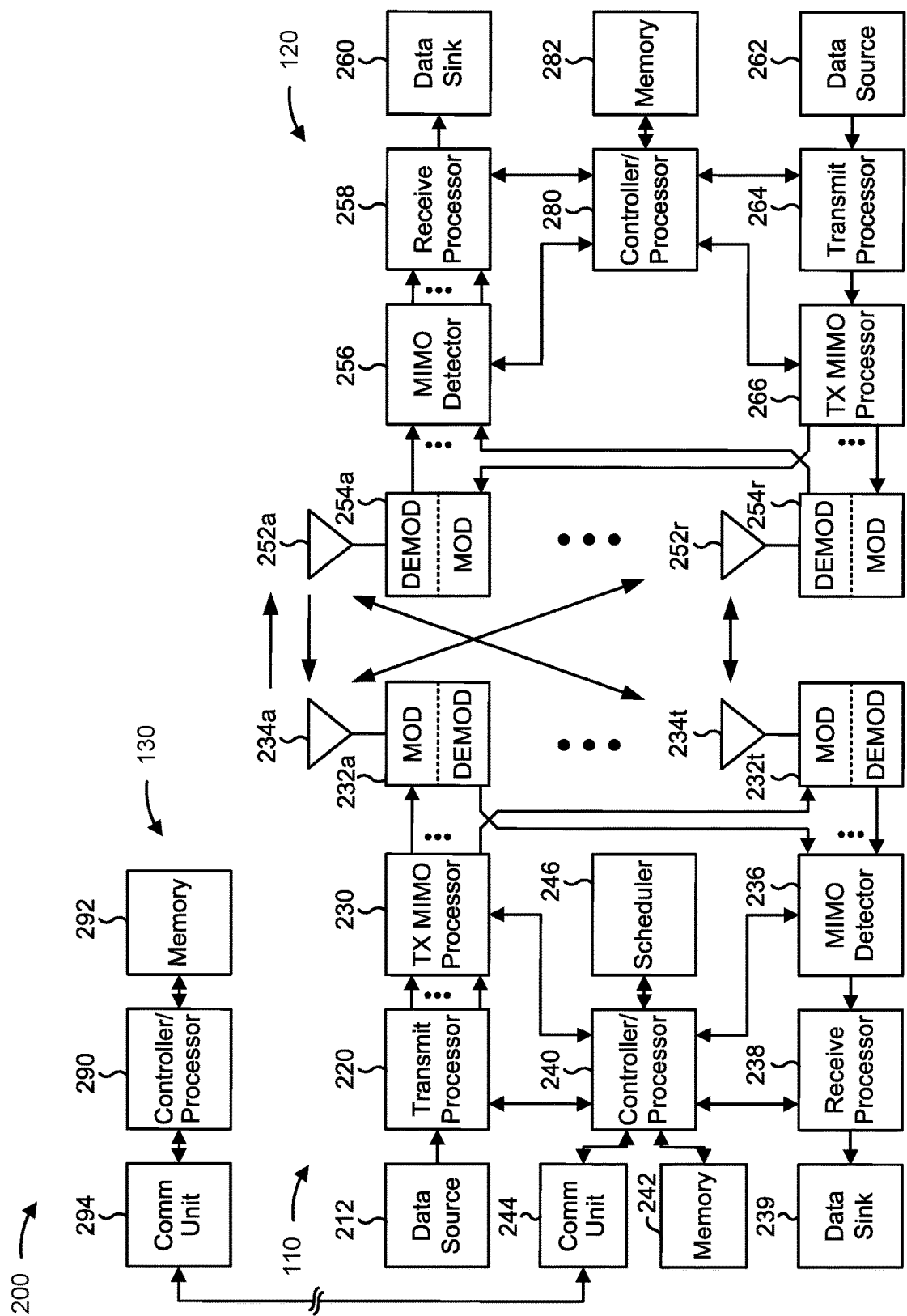
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

Network controller 130 may include communication unit 294, controller/processor 290, and memory 292. Network controller 130 may include, for example, one or more devices in a core network. Network controller 130 may communicate with base station 110 via communication unit 294.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-13.

Controller/processor 240 of base station 110, controller/processor 280 of UE 120, and/or any other component(s) of FIG. 2 may perform one or more techniques associated with joint beam management for backhaul links and access links, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, a node (e.g., the UE 120) may include means for receiving a configuration that indicates a first resource set and a second resource set for beam management, wherein the first resource set is configured for beam management for a direct link between the node and a base station and the second resource set is configured for beam management for an indirect link between the node and the base station via a millimeter wave repeater (e.g., using antenna 252, DEMOD 254, MIMO detector 256, receive processor 258, controller/processor 280, memory 282, and/or the like); means for determining whether the node is communicating with the base station via the direct link or via the indirect link (e.g., using antenna 252, DEMOD 254, MOD 254, MIMO detector 256, receive processor 258, transmit processor 264, TX MIMO processor 266, controller/processor 280, memory 282, and/or the like); means for using one of the first resource set or the second resource set for a beam management procedure based at least in part on determining whether the node is communicating with the base station via the direct link or via the indirect link (e.g., using antenna 252, DEMOD 254, MOD 254, MIMO detector 256, receive processor 258, transmit processor 264, TX MIMO processor 266, controller/processor 280, memory 282, and/or the like); and/or the like. In some aspects, such means may include one or more components of UE 120 described in connection with FIG. 2.

In some aspects, the base station 110 may include means for transmitting a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node (e.g., using controller/processor 240, transmit processor 220, TX MIMO processor 230, MOD 232, antenna 234, memory 242, and/or the like); means for identifying a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node (e.g., using controller/processor 240, transmit processor 220, TX MIMO processor 230, MOD 232, DEMOD 232, antenna 234, MIMO detector 236, receiver processor 238, memory 242, and/or the like); and/or the like. In some aspects, such means may include one or more components of base station 110 described in connection with FIG. 2.

In some aspects, the base station 110 may include means for transmitting a configuration that indicates a first resource set and a second resource set for beam management, wherein the first resource set is configured for beam management for a direct link between a node and the base station and the second resource set is configured for beam management for an indirect link between the node and the base station via a millimeter wave repeater (e.g., using controller/processor 240, transmit processor 220, TX MIMO processor 230, MOD 232, antenna 234, memory 242, and/or the like); means for using the first resource set to perform a first beam management procedure with a first node that has a direct link with the base station (e.g., using controller/processor 240, transmit processor 220, TX MIMO processor 230, MOD 232, DEMOD 232, antenna 234, MIMO detector 236, receiver processor 238, memory 242, and/or the like); means for using the second resource set to perform a second beam management procedure with a second node that has an indirect link with the base station via a millimeter wave repeater (e.g., using controller/processor 240, transmit processor 220, TX MIMO processor 230, MOD 232, DEMOD 232, antenna 234, MIMO detector 236, receiver processor 238, memory 242, and/or the like); and/or the like. In some aspects, such means may include one or more components of base station 110 described in connection with FIG. 2.

As indicated above, FIG. 2 is provided as an example. Other examples may differ from what is described with regard to FIG. 2.

Figure 3:
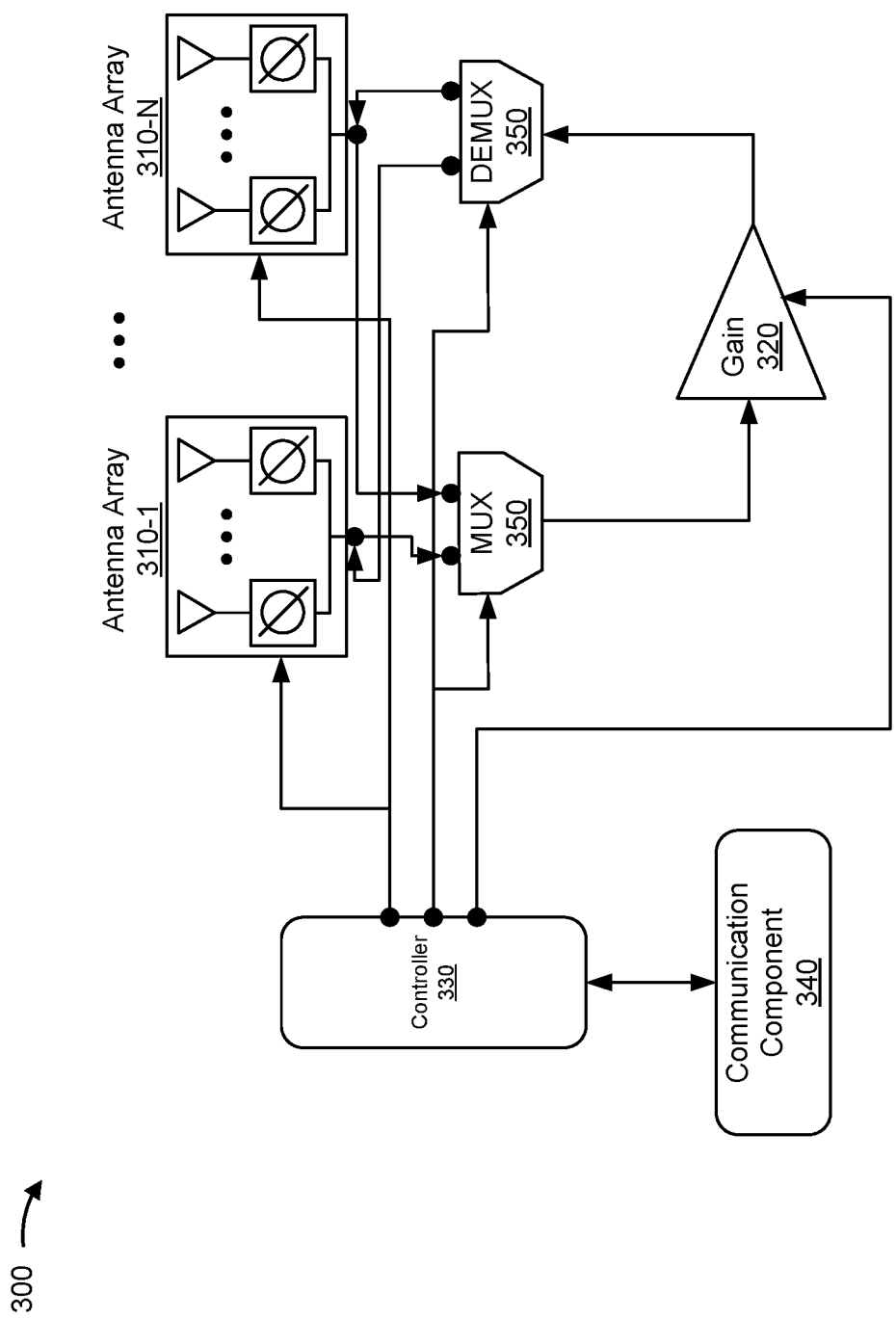
FIG. 3 is a diagram illustrating an example millimeter wave repeater, in accordance with various aspects of the present disclosure.

FIG. 3 is a diagram illustrating an example of a millimeter wave repeater 300, in accordance with various aspects of the present disclosure. In some aspects, millimeter wave repeater 300 may correspond to millimeter wave repeater 140 shown in FIG. 1.

As shown in FIG. 3, the millimeter wave repeater 300 may include one or more antenna arrays 310-1 through 310-N (N>1), a gain component 320, a controller 330, a communication component 340, and a multiplexer (MUX) and/or demultiplexer (DEMUX) (MUX/DEMUX) 350.

An antenna array 310 includes multiple antenna elements capable of being configured for beamforming. For example, an antenna array 310 may be referred to as a phased array because phase values and/or phase offsets of the antenna elements may be configured to form a beam, with different phase values and/or phase offsets being used for different beams (e.g., in different directions). In some aspects, an antenna array 310 may be a fixed receive (RX) antenna array capable of only receiving communications while not transmitting communications. In some aspects, an antenna array 310 may be a fixed transmit (TX) antenna array capable of only transmitting communications while not receiving communications. In some aspects, an antenna array 310 may be capable of being configured to act as an RX antenna array or a TX antenna array (e.g., via a TX/RX switch, a MUX/DEMUX, and/or the like). The antenna arrays 310 may be capable of communicating using millimeter waves.

Gain component 320 includes a component capable of amplifying an input signal and outputting an amplified signal. For example, gain component 320 may include a power amplifier, a variable gain component, and/or the like. In some aspects, gain component 320 may have variable gain control. The gain component 320 may connect to an RX antenna array (e.g., a first antenna array 310-1) and a TX antenna array (e.g., a second antenna array 310-2) such that an analog millimeter wave signal, received via the RX antenna array, can be amplified by the gain component 320 and output to the TX antenna array for transmission. In some aspects, the level of amplification of the gain component 320 may be controlled by the controller 330.

Controller 330 includes a component capable of controlling one or more other components of the millimeter wave repeater 300. For example, the controller 330 may include a controller, a microcontroller, a processor, and/or the like. In some aspects, the controller 330 may control the gain component 320 by controlling a level of amplification or gain applied by the gain component 320 to an input signal. Additionally, or alternatively, the controller 330 may control an antenna array 310 by controlling a beamforming configuration for the antenna array 310 (e.g., one or more phase values for the antenna array 310, one or more phase offsets for the antenna array 310, one or more power parameters for the antenna array 310, one or more beamforming parameters for the antenna array 310, a TX beamforming configuration, an RX beamforming configuration, and/or the like), by controlling whether the antenna array 310 acts as an RX antenna array or a TX antenna array (e.g., by configuring interaction and/or connections between the antenna array 310 and a MUX/DEMUX 350), and/or the like. Additionally, or alternatively, the controller 330 may power on or power off one or more components of millimeter wave repeater 300 (e.g., when a base station 110 does not need to use the millimeter wave repeater to serve UEs 120). In some aspects, the controller 330 may control a timing of one or more of the above configurations.

Communication component 340 may include a component capable of wirelessly communicating with a base station 110 using a wireless technology other than millimeter wave (e.g., via a control interface). For example, the communication component 340 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a sub-6 GHz technology, a visible light communication technology, and/or the like. In some aspects, the communication component 340 may use a lower frequency communication technology, and an antenna array 310 may use a higher frequency communication technology (e.g., millimeter wave and/or the like). In some aspects, an antenna array 310 may be used to transfer data between the millimeter wave repeater 300 and the base station 110, and the communication component 340 may be used to transfer control information between the millimeter wave repeater 300 and the base station 110 (e.g., a report, a configuration, instructions to power on or power off one or more components, and/or the like).

MUX/DEMUX 350 may be used to multiplex and/or demultiplex communications received from and/or transmitted to an antenna array 310. For example, MUX/DEMUX 350 may be used to switch an RX antenna array to a TX antenna array.

In some aspects, the millimeter wave repeater 300 does not include any components for digital signal processing. For example, in some aspects, the millimeter wave repeater 300 does not include a digital signal processor, a baseband processor, a digital-to-analog converter (DAC), an analog-to-digital converter (ADC), and/or the like. In this way, a cost to produce the millimeter wave repeater 300 may be reduced. Furthermore, latency may be reduced by eliminating digital processing of received millimeter wave signals prior to transmission of corresponding amplified millimeter wave signals.

In some aspects, one or more antenna arrays 310, gain component 320, controller 330, communication component 340, MUX/DEMUX 350, and/or the like may perform one or more techniques associated with communicating with and/or configuring an analog millimeter wave repeater, as described in more detail elsewhere herein. For example, one or more components of millimeter wave repeater 300 may perform or direct operations of, for example, process 1100 of FIG. 11 and/or other processes as described herein. In some aspects, the millimeter wave repeater 300 includes a transceiver. The transceiver may include any combination of antenna arrays 310, gain component 320, controller 330, communication component 340, MUX/DEMUX 350, and/or a memory. The transceiver may be used by a processor (e.g., controller 330) and the memory to perform aspects of any of the methods described herein, for example, as described with reference to FIGS. 7-13. In some aspects, the memory may comprise a non-transitory computer-readable medium storing one or more instructions for wireless communication. For example, the one or more instructions, when executed (e.g., directly, or after compiling, converting, interpreting, and/or the like) by one or more processors of the millimeter wave repeater 300, may perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, interpreting the instructions, and/or the like.

In some aspects, millimeter wave repeater 300 may include means for receiving a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node (e.g., using one or more antenna arrays 310, controller 330, communication component 340, and/or the like); means for receiving the one or more reference signals via the first set of resources according to the configuration (e.g., using one or more antenna array 310s, controller 330, MUX 350, DEMUX 350, and/or the like); means for relaying the one or more reference signals via the second set of resources according to the configuration (e.g., using one or more antenna array 310s, gain component 320, controller 330, MUX 350, DEMUX 350, and/or the like); and/or the like. In some aspects, such means may include one or more components of millimeter wave repeater 300 described in connection with FIG. 3.

As indicated above, FIG. 3 is provided as an example. Other examples may differ from what is described with regard to FIG. 3. For example, millimeter wave repeater 300 may include additional components, fewer components, different components, or differently arranged components than those shown in FIG. 3. Furthermore, two or more components shown in FIG. 3 may be implemented within a single component, or a single component shown in FIG. 3 may be implemented as multiple components. Additionally, or alternatively, a set of components (e.g., one or more components) of millimeter wave repeater 300 may perform one or more functions described as being performed by another set of components of millimeter wave repeater 300.

Figure 4:
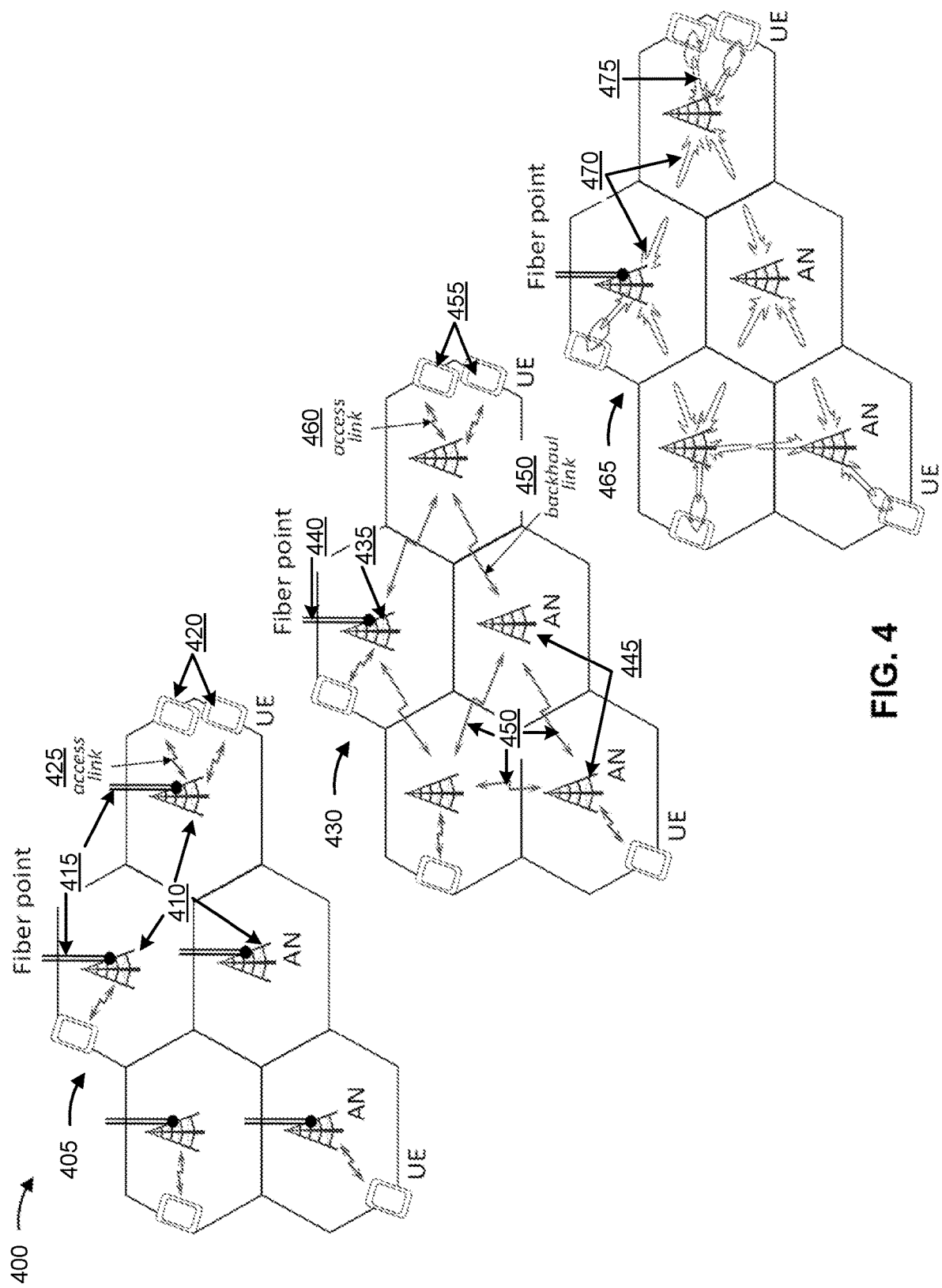
FIG. 4 is a diagram illustrating examples of radio access networks, in accordance with various aspects of the present disclosure.

FIG. 4 is a diagram illustrating examples 400 of radio access networks, in accordance with various aspects of the disclosure.

As shown by reference number 405, a traditional (e.g., 3G, 4G, LTE, and/or the like) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may correspond to a base station 110 shown in FIG. 1. Similarly, a UE 420 shown in FIG. 4 may correspond to a UE 120 shown in FIG. 1.

As shown by reference number 430, a radio access network may include a wireless backhaul network, sometimes referred to as an integrated access and backhaul (IAB) network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly with or indirectly with (e.g., via one or more other non-anchor base stations 445) the anchor base station 435 via one or more backhaul links 450 to form a backhaul path to the core network for carrying backhaul traffic. Backhaul link 450 may be a wireless link. Anchor base station(s) 435 and/or non-anchor base station(s) 445 may communicate with one or more UEs 455 via access links 460, which may be wireless links for carrying access traffic. In some aspects, an anchor base station 435 and/or a non-anchor base station 445 shown in FIG. 4 may correspond to a base station 110 shown in FIG. 1. Similarly, a UE 455 shown in FIG. 4 may correspond to a UE 120 shown in FIG. 1.

As shown by reference number 465, in some aspects, a radio access network that includes an IAB network may utilize millimeter wave technology and/or directional communications (e.g., beamforming, precoding, and/or the like) for communications between base stations and/or UEs (e.g., between two base stations, between two UEs, and/or between a base station and a UE). For example, wireless backhaul links 470 between base stations may use millimeter waves to carry information and/or may be directed toward a target base station using beamforming, precoding, and/or the like. Similarly, the wireless access links 475 between a UE and a base station may use millimeter waves and/or may be directed toward a target wireless node (e.g., a UE and/or a base station). In this way, inter-link interference may be reduced.

In some aspects, an IAB network may support a multi-hop network and/or a multi-hop wireless backhaul. Additionally, or alternatively, each node of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported. In some aspects, an IAB donor may include a central unit (CU) that configures IAB nodes that access a core network via the IAB donor and may include a distributed unit (DU) that schedules and communicates with child nodes of the IAB donor. An IAB node may include a mobile terminal (MT) that is scheduled by and communicates with a DU of a parent node and may include a DU that schedules and communicates with child nodes of the IAB donor. A DU of a node may perform functions described in connection with base station 110 for that node, and an MT of a node may perform functions described in connection with UE 120 for that node.

When an IAB network or another type of wireless communication network uses millimeter wave communications, propagation distances can be improved by using a millimeter wave repeater 140, as described below. In some aspects, a backhaul link may refer to a link between a base station and a millimeter wave repeater, and an access link may refer to a link between a millimeter wave repeater and a UE.

As indicated above, FIG. 4 is provided as an example. Other examples may differ from what is described with regard to FIG. 4.

Figure 5:
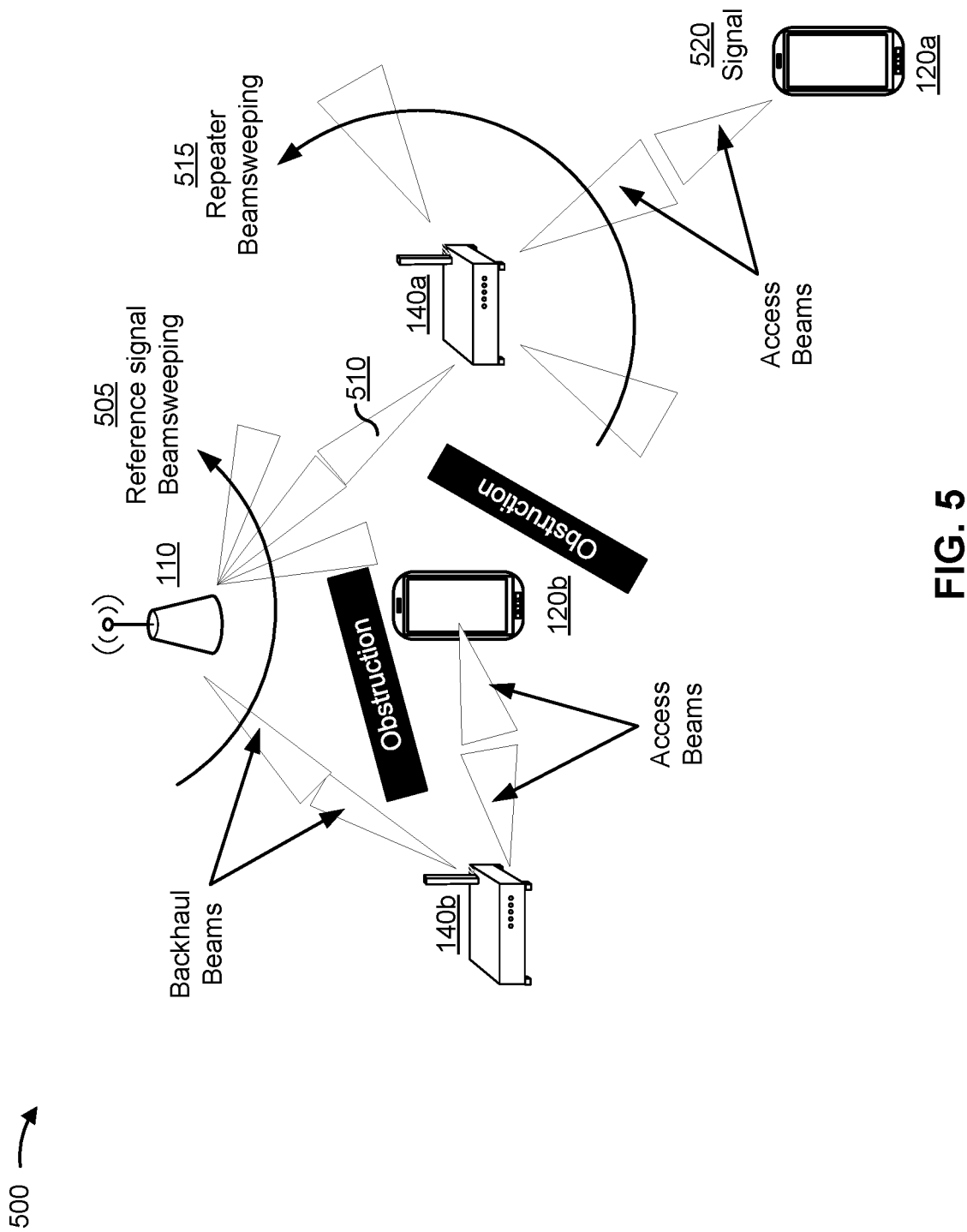
FIG. 5 is a diagram illustrating an example of communicating using a millimeter wave repeater, in accordance with various aspects of the present disclosure.

FIG. 5 is a diagram illustrating an example 500 of communicating using a millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 (which include, in the example of FIG. 5, repeater 140a and repeater 140b) to increase the coverage area of a base station 110, to extend coverage to UEs 120 (which include, in the example of FIG. 5, UE 120a and UE 120b) without line of sight to the base station 110 (e.g., due to an obstruction), and/or the like.

For example, as illustrated in the example of FIG. 5, an obstruction between UE 120b and base station 110 blocks or otherwise reduces the quality of a link between the base station 110 and UE 120b. Similarly, an obstruction between UE 120*b* and repeater 140*a* blocks or otherwise reduces the quality of a link between the repeater 140*a* and the UE 120*b*. However, no obstructions or fewer obstructions exist between repeater 140*b* and UE 120*b*, and, as such, it is possible that communications between repeater 140*b* and UE 120*b* will have a higher quality than communications between base station 110 and UE 120*b* or between repeater 140*a* and UE 120*b*. Furthermore, the millimeter wave repeater 140 described herein may be a layer 1 or an analog millimeter wave repeater, which is associated with a lower cost, less processing, and lower latency than a layer 2 or layer 3 repeater.

A millimeter wave repeater 140 (sometimes referred to herein as a repeater 140) may perform directional communication by using beamforming to communicate with a base station 110 via a first beam pair (e.g., a backhaul beam pair over a backhaul link with the base station 110) and to communicate with a UE 120 via a second beam pair (e.g., an access beam pair over an access link with the UE 120). For example, in example 500, repeater 140*a* can communicate with base station 110 via a first beam pair and can communicate with UE 120*a* via a second beam pair. Similarly, repeater 140*b* can communicate with base station 110 via a first beam pair and can communicate with UE 120*a* via a second beam pair. A beam pair may refer to a transmit (Tx) beam used by a first device for transmission and a receive (Rx) beam used by a second device for reception of information transmitted by the first device via the Tx beam.

As shown by reference number 505, a base station 110 may use a beamsweeping procedure to transmit reference signals (e.g., synchronization signal blocks (SSBs), channel state information reference signals (CSI-RS), and/or the like) via multiple beams over time (e.g., using time division multiplexing (TDM)). An SSB may include timing information (e.g., a primary synchronization signal (PSS) and a secondary synchronization signal (SSS)), system information (e.g., remaining minimum system information (RMSI), system information in a physical broadcast channel (PBCH), and/or the like), and/or information that identifies a beam via which the SSB is transmitted (e.g., a beam index). As shown by reference number 510, the repeater 140*a* may receive a reference signal via an Rx beam of the repeater 140*a*.

As shown by reference number 515, the repeater 140*a* may relay each received reference signal via multiple Tx beams of the repeater 140*a* (e.g., using TDM). As used herein, relaying a received signal may refer to transmitting the received signal (e.g., after amplifying the received signal) without decoding the received signal and/or without modifying information carried in the received signal. Alternatively, relaying a received signal may refer to transmitting the received signal after decoding the received signal and/or modifying information carried in the received signal. In some aspects, a received signal may be relayed using a different time resource, a different frequency resource, and/or a different spatial resource (e.g., a different beam) to transmit the signal as compared to a time resource, a frequency resource, and/or a spatial resource in which the signal was received.

As shown by reference number 520, a UE 120*a* may receive a relayed reference signal and may use information included in the reference signal (e.g., timing information, system information, and/or a beam index) to generate a signal to be transmitted to the base station 110, such as a measurement report, a random access channel (RACH) message, and/or the like. The UE 120*a*, for example, may then transmit the signal to the repeater 140*a* for relaying to the base station 110. In some aspects, the signal may be used by the base station 110 and/or the UE 120*a* to perform a beam management procedure (e.g., to select beam(s) for communication).

As indicated above, FIG. 5 is provided as an example. Other examples may differ from what is described with regard to FIG. 5.

Figure 6:
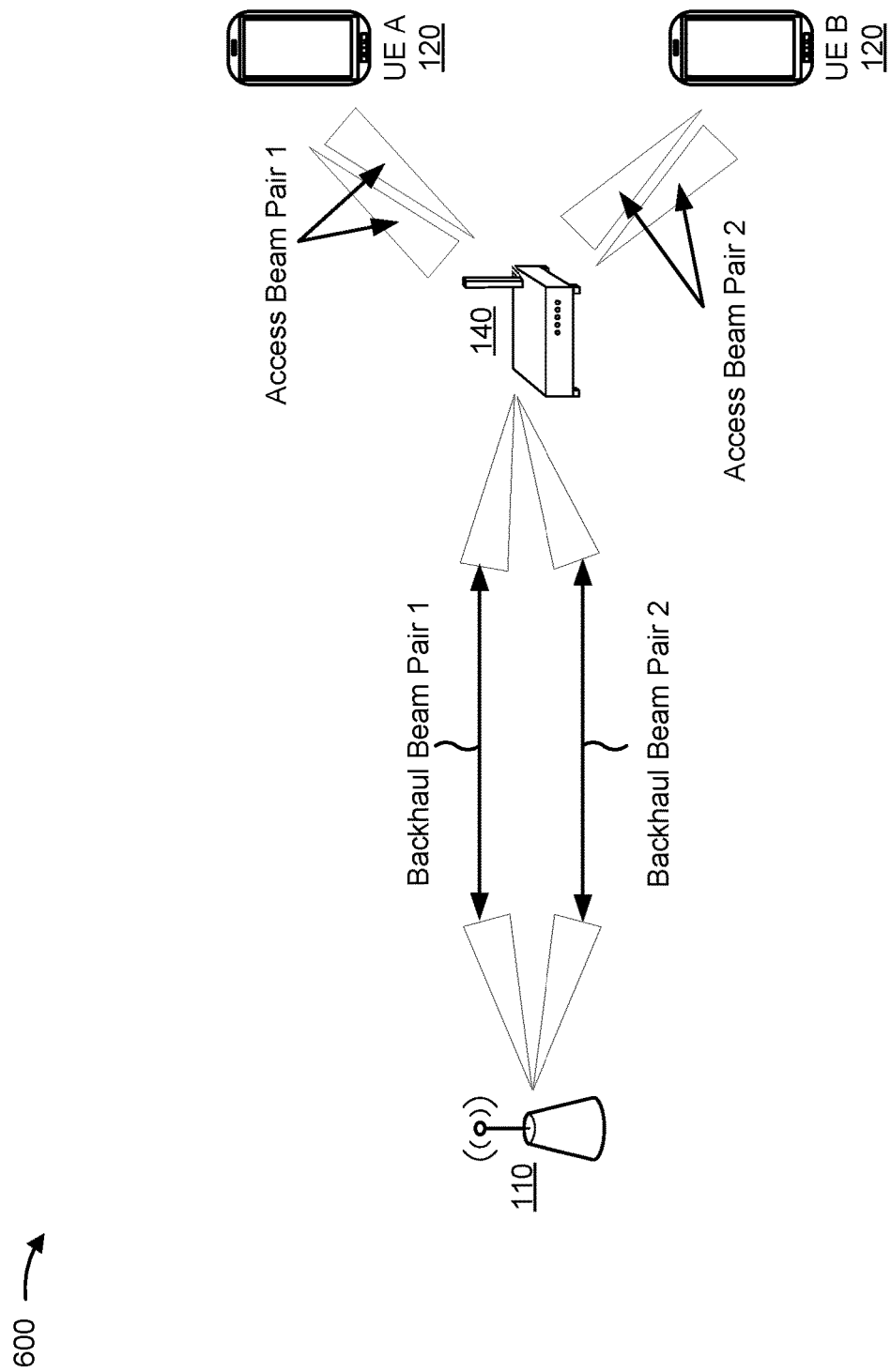
FIG. 6 is a diagram illustrating an example of beam pair links between a base station and a millimeter wave repeater and beam pair links between a millimeter wave repeater and a UE, in accordance with various aspects of the present disclosure.

FIG. 6 is a diagram illustrating an example 600 of beam pair links between a base station 110 and a millimeter wave repeater 140 and beam pair links between a millimeter wave repeater 140 and a UE 120, in accordance with various aspects of the present disclosure.

In some cases, a millimeter wave repeater 140 may only be capable of receiving and relaying a signal over a millimeter wave interface. For example, the repeater 140 may not be capable of generating a signal for transmission over a millimeter wave interface (but may be capable of generating a signal for transmission over a control interface that does not use millimeter waves), may not be capable of processing signals received via a millimeter wave interface, and/or the like. As a result, access procedures and beam management procedures between a base station 110 and a UE 120 that communicate indirectly via a millimeter wave repeater 140 may be complicated.

For example, for beam management over a backhaul link between a base station 110 and a repeater 140, the repeater 140 may not be capable of measuring and/or processing downlink reference signals like SSBs, CSI-RSs, and/or the like to determine a beam pair link to be used for communication. Furthermore, the repeater 140 may not be capable of generating and transmitting uplink reference signals like sounding reference signals (SRSs) or the like to permit the base station 110 to determine a beam pair link to be used for communication. Similarly, for beam management over an access link between a UE 120 and a repeater 140, the repeater 140 may only be capable of receiving and relaying a signal between the UE 120 and a base station 110, which may increase signaling overhead when a beam pair link has not yet been established between the repeater 140 and the UE 120 (e.g., due to multiple signals being transmitted over multiple beams). Beam management may be further complicated when multiple repeaters 140 are used as intermediaries for signal transmission between a UE 120 and a base station 110.

In some cases, to assist with beam management, a repeater 140 may generate and transmit a wideband signal after receiving a narrowband signal (e.g., via a beam) or may support receive (Rx) power measurement. However, these techniques require additional capabilities and additional processing at the repeater 140, which consumes additional resources (e.g., processing resources, memory resources, and/or the like). Furthermore, in some cases, these techniques may identify a backhaul beam pair independent of a selected access beam pair and may identify an access beam pair independent of a selected backhaul beam pair. However, in some cases, the best backhaul beam pair may depend on a selected access beam pair and vice versa.

For example, a repeater 140 may operate in full duplex mode with concurrent transmission and reception of signals (e.g., in a same time resource). As a result, the repeater 140 may generate self-interference or leakage from a transmission (Tx) antenna port to a reception (Rx) antenna port. The amount of self-interference may depend on, for example, the Tx beam and/or the Rx beam being used by the repeater 140, environmental factors (e.g., obstructions, channel conditions, and/or the like), a desired gain level, and/or the like.

Referring to FIG. 6, the best backhaul beam pair between the repeater 140 and the base station 110, independent of other factors, may be backhaul beam pair 1 and the best access beam pair between the repeater 140 and UE A may be access beam pair 1. However, communicating using backhaul beam pair 1 may result in more self-interference with access beam pair 1 than communicating using backhaul beam pair 2. Thus, the best combination of beam pairs for communications between UE A and the base station 110 may be backhaul beam pair 2 and access beam pair 1, even though backhaul beam pair 1 may be a better beam pair than backhaul beam pair 2 independent of the access link used to communicate with UE A. Some techniques and apparatuses described herein permit joint beam management for backhaul links and access links, which may assist with selecting the best combination of a backhaul beam pair and an access beam pair, which may depend on one another.

As indicated above, FIG. 6 is provided as an example. Other examples may differ from what is described with regard to FIG. 6.

Figure 7:
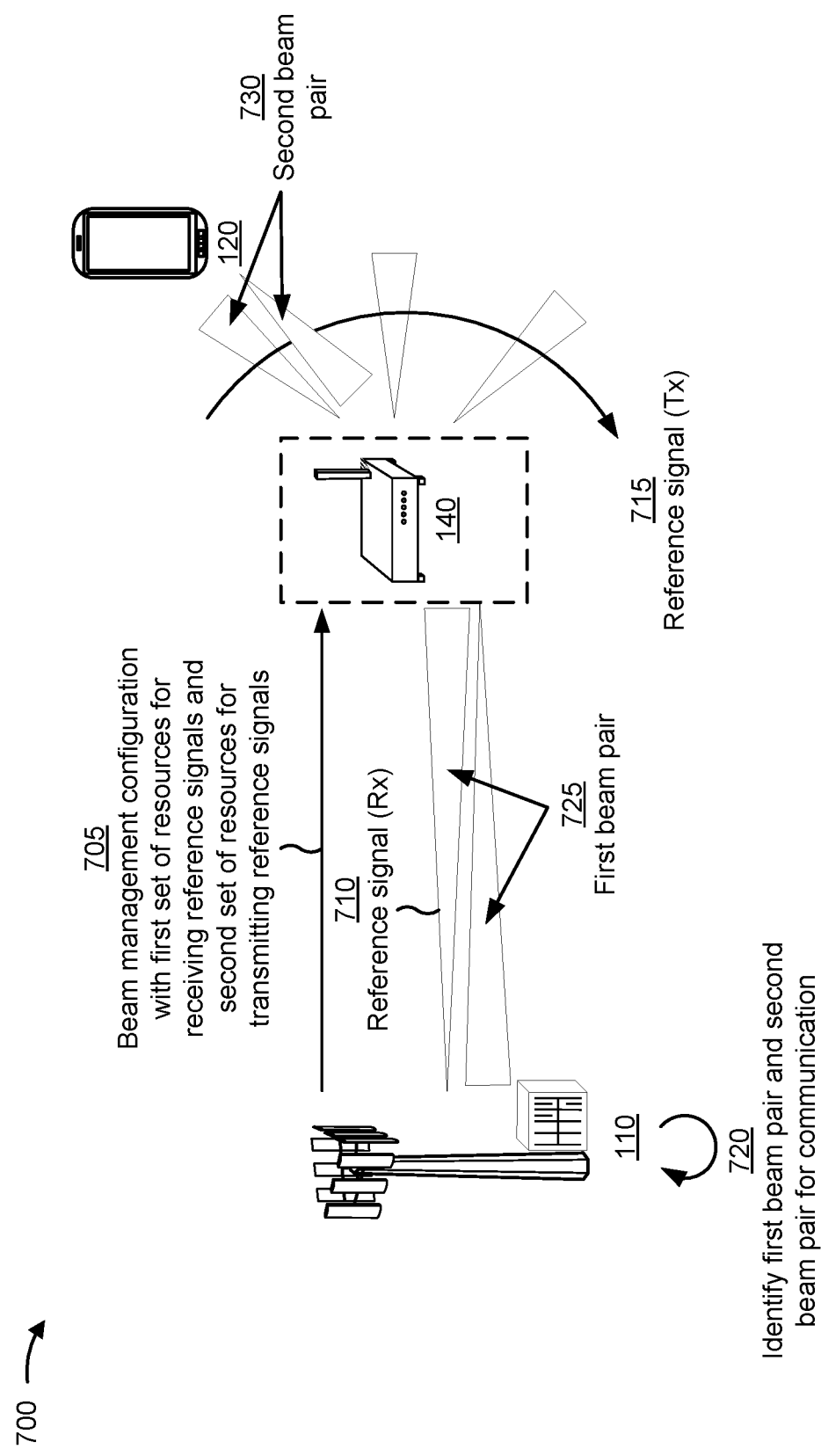
FIGS. 7-9 are diagrams illustrating examples of joint beam management for backhaul links and access links, in accordance with various aspects of the present disclosure.

FIG. 7 is a diagram illustrating an example 700 of joint beam management for backhaul links and access links, in accordance with various aspects of the present disclosure.

As shown by reference number 705, a base station 110 may transmit a configuration that indicates a resource set to be used by a millimeter wave repeater 140 for beam management. As shown, the resource set may include a first set of resources to be used by the millimeter wave repeater 140 to receive one or more reference signals from a first node (e.g., the base station 110 in example 700) and a second set of resources to be used by the millimeter wave repeater 140 to relay the one or more reference signals to a second node (e.g., a UE 120 in example 700). In some aspects, the configuration may be transmitted and/or received via a control interface that uses a sub-6 GHz signal (e.g., and not a millimeter wave signal), such as via communication component 340 of repeater 140. In example 700, the first node is the base station 110 and the second node is a UE 120. As described below in connection with FIG. 8, in some aspects, the first node is the UE 120 and the second node is the base station 110. Alternatively, in some aspects, the first node may be a first UE 120 and the second node may be a second UE 120.

In some aspects, the configuration may include an indication of one or more beamforming configurations to be used by the repeater 140 to receive and/or relay communications, such as a beam parameter, a quasi co-location (QCL) relationship, a transmission configuration indication (TCI) state, a spatial relation, a beam width, a beam sweeping configuration, and/or the like. Additionally, or alternatively, the configuration may indicate multiple beams to be used by the millimeter wave repeater 140 for relaying a reference signal that is received by the millimeter wave repeater 140 via a single beam.

For example, as shown by reference number 710, the base station 110 may transmit a reference signal (e.g., an SSB, a CSI-RS, and/or the like) to the repeater 140 via a beam. As shown by reference number 715, the repeater 140 may transmit the received reference signal via multiple beams. In some aspects, the first set of resources and the second set of resources are over a same time interval. In this case, the repeater 140 may relay a signal (e.g., using multiple beams) in the same time interval in which the signal is received (e.g., a same transmission time interval (TTI), such as a mini-slot, a slot, a subframe, a frame, one or more symbols, and/or the like). For example, the repeater 140 may relay a signal in a same TTI without adding a time shift or a time offset. Alternatively, the repeater 140 may relay the signal in a TTI included in a set of TTIs configured for relaying the signal. For example, the repeater 140 may receive the signal in a first TTI, may transmit the signal on a first beam in a second TTI, may transmit the signal on a second beam in a third TTI, and so on. The first TTI, the second TTI, the third TTI, and so on may be included in a set of TTIs configured for the signal.

In some aspects, the first set of resources and the second set of resources are over a same frequency band. In this case, the repeater 140 may relay a signal using a same frequency with which the signal is received (e.g., without applying a frequency shift or a frequency offset). In some aspects, the first set of resources and the second set of resources have a same bandwidth size with different frequencies. In this case, the repeater 140 may relay a signal using a different frequency than a frequency with which the signal is received (e.g., by applying a frequency offset).

In some aspects, the resource set indicated in the configuration is configured for beam management for an indirect link (e.g., via the repeater 140) between the base station 110 and one of a first node or a second node (e.g., between the base station 110 and the UE 120 in example 700). In some aspects, the configuration may further indicate another resource set configured for beam management for a direct link (e.g., without using a repeater 140 as an intermediary) between the base station 110 and one of the first node or the second node (e.g., between the base station 110 and the UE 120 in example 700). Additional details regarding using separate resource sets for direct links versus indirect links are described below in connection with FIG. 9.

As shown by reference number 720, the base station 110 may identify a first beam pair and a second beam pair based at least in part on transmitting the configuration. As shown by reference number 725, the first beam pair may be between the millimeter wave repeater 140 and the first node (e.g., the base station 110 in example 700). As shown by reference number 730, the second beam pair may be between the millimeter wave repeater 140 and the second node (e.g., the UE 120 in example 700). The first beam pair and the second beam pair may be identified according to a beam management procedure for a millimeter wave interface. The base station 110 may identify the first beam pair and the second beam pair based at least in part on one or more reference signals transmitted, received, and/or relayed in accordance with the configuration, as described in more detail below.

In example 700, the base station 110 may transmit one or more downlink reference signals (e.g., one or more SSBs, one or more CSI-RSs, and/or the like) to the repeater 140 via a corresponding one or more beams (e.g., using one beam for each downlink reference signal) according to the configuration. For each downlink reference signal received via a beam (e.g., via an Rx beam of the repeater 140), the repeater 140 may relay that downlink reference signal via multiple beams (e.g., multiple Tx beams of the repeater) according to the configuration, as shown. In some aspects, the configuration may indicate a correspondence between an Rx resource (e.g., a time resource, a frequency resource, a beam, and/or the like) via which the downlink reference signal is received by the repeater 140, and a set of Tx resources (e.g., a set of time resources, a set of frequency resources, a set of beams, and/or the like) via which the downlink reference signal is to be relayed by the repeater 140. Thus, the repeater 140 may receive a signal via a first resource and may relay the signal via one or more second resources (that correspond to the first resource) according to the configuration.

The UE 120 may receive one or more relayed downlink reference signals from the repeater 140 and may perform measurement and/or reporting of the one or more relayed downlink reference signals according to the configuration. In some aspects, the base station 110 may transmit (e.g., via the repeater 140) an instruction for the second node (e.g., the UE 120 in example 700) to perform measurement and/or reporting of the one or more downlink reference signals. In this case, the UE 120 may perform measurement and reporting for the reference signal(s) based at least in part on the instruction (e.g., which may include a reporting configuration). In some aspects, the instruction may be included in the configuration, which may be relayed by the repeater 140 to the UE 120.

In some aspects, the instruction may indicate a set of resources to be monitored by the UE 120 for the reference signals. For example, the set of resources may be the second set of resources (e.g., the time resources, frequency resources, and/or beams used by the repeater 140 to relay the reference signals). The UE 120 may monitor the set of resources and may measure the reference signals on the set of resources. Based at least in part on the measurements, the second node (e.g., the UE 120 in example 700) may transmit a measurement report to the base station 110 (e.g., via the repeater 140).

The base station 110 may identify the first beam pair and the second beam pair based at least in part on the measurement report. For example, a measurement by the UE 120 in a resource may correspond to a reference signal transmitted by the base station 110 to the repeater 140 via a first beam pair and relayed by the repeater 140 to the UE 120 via a second beam pair. Thus, by identifying a resource corresponding to the best measurement (e.g., among multiple reported measurements included in one or more measurement reports), the base station 110 may identify the best combination of a backhaul beam pair (e.g., the first beam pair) and an access beam (e.g., the second beam pair). In some aspects, the base station 110 may perform a random access channel (RACH) procedure (e.g., with the UE 120) using the first beam pair and the second beam pair (e.g., by transmitting and/or receiving a RACH message via the first beam pair and the second beam pair). For example, the base station 110 may exchange RACH messages with a UE 120, where the RACH messages are relayed by the millimeter wave repeater 140 using the first beam pair (e.g., for one of Rx or Tx) and the second beam pair (e.g., for the other of Rx or Tx).

In some aspects, the base station 110 may configure the repeater 140 and/or the UE 120 with a set of beams (e.g., an Rx beam and/or a Tx beam) based at least in part on identifying the first beam pair and the second beam pair. For example, the base station 110 may configure the repeater 140 to transmit communications to the base station 110 using a repeater Tx beam of the first beam pair, to receive communications from the base station 110 using a repeater Rx beam of the first beam pair, to transmit communications to the UE 120 using a repeater Tx beam of the second beam pair, and/or to receive communications from the UE 120 using a repeater Rx beam of the second beam pair. Additionally, or alternatively, the base station 110 may configure the UE 120 to transmit communications to the repeater 140 using a UE Tx beam of the second beam pair and/or to receive communications from the repeater 140 using a UE Rx beam of the second beam pair.

In some aspects, the repeater 140 may transmit, to the base station 110, a report regarding a power setting or a measured receive (Rx) power of the repeater 140. In some aspects, the power setting and/or the measured Rx power may be reported for a specific Tx beam and/or Rx beam of the repeater 140 (e.g., according to the configuration).

In some aspects, the base station 110 may transmit another configuration that indicates another resource set to be used by the repeater 140 for refined beam management. For example, the base station 110 may use a first configuration (e.g., described in connection with reference number 705) to identify a first beam pair and/or a second beam pair having a wider beamwidth, and may perform refined beam management to identify a third beam pair (e.g., between the first node and the repeater 140) and a fourth beam pair (e.g., between the second node and the repeater 140) having a narrower beamwidth. The refined beam management may be similar to the beam management described in connection with reference numbers 705-730, but the reference signals may be transmitted, received, and/or relayed via narrower beams in the refined beam management as compared to the beam management described in connection with reference numbers 705-730.

As indicated above, FIG. 7 is provided as an example. Other examples may differ from what is described with regard to FIG. 7.

Figure 8:
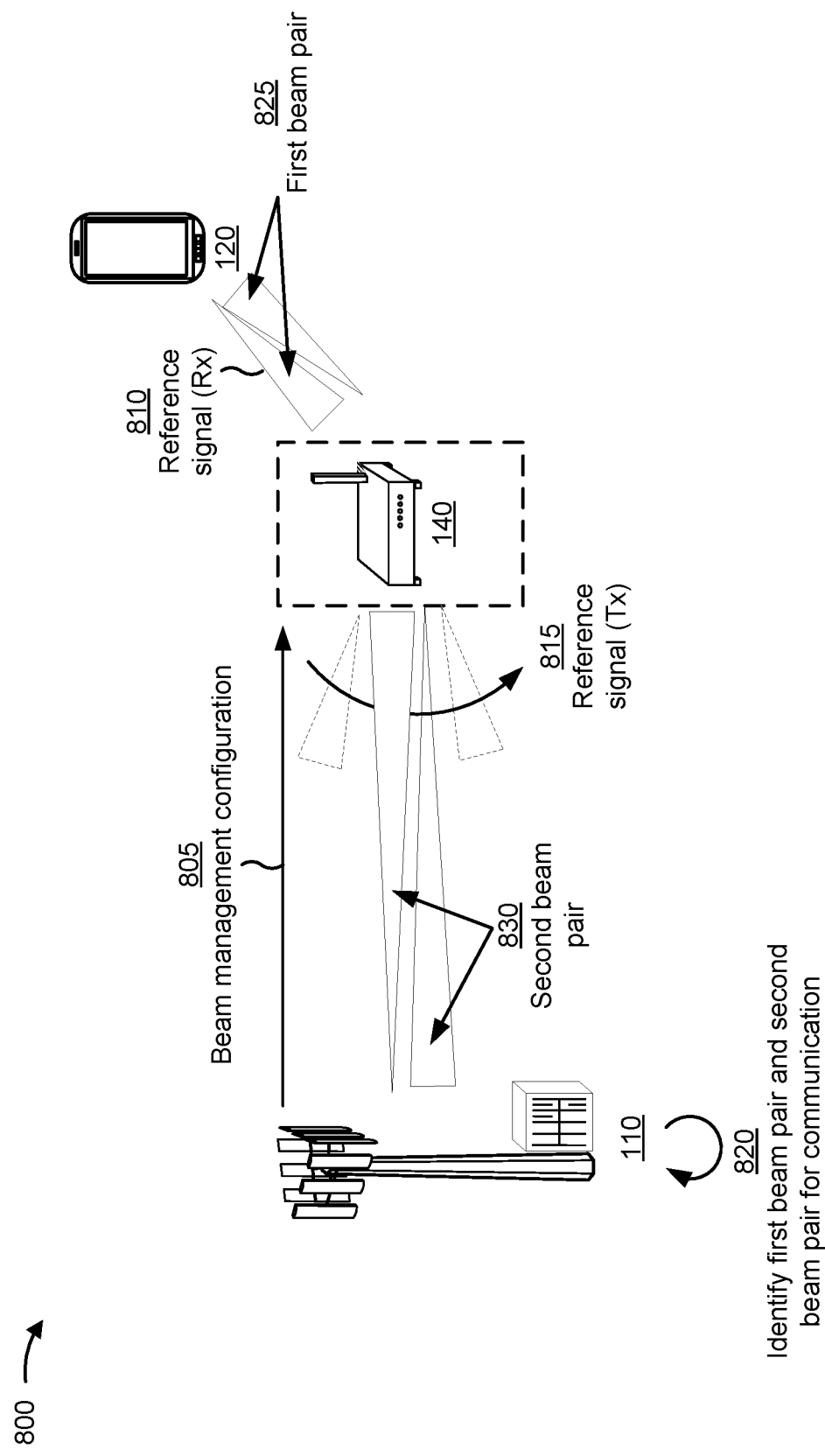

FIG. 8 is a diagram illustrating another example 800 of joint beam management for backhaul links and access links, in accordance with various aspects of the present disclosure.

As shown by reference number 805, a base station 110 may transmit a configuration that indicates a resource set to be used by a millimeter wave repeater 140 for beam management, in a similar manner as described above in connection with FIG. 7. As shown, the resource set may include a first set of resources to be used by the millimeter wave repeater 140 to receive one or more reference signals from a first node (e.g., a UE 120 in example 800) and a second set of resources to be used by the millimeter wave repeater 140 to relay (e.g., transmit) the one or more reference signals to a second node (e.g., the base station 110 in example 800). In some aspects, the configuration may be transmitted and/or received via a control interface that uses a sub-6 GHz signal (e.g., and not a millimeter wave signal), such as via communication component 340 of repeater 140. In example 800, the first node is a UE 120 and the second node is a base station 110.

In some aspects, the configuration may include an indication of one or more beamforming configurations to be used by the repeater 140 to receive and/or relay communications. Additionally, or alternatively, the configuration may indicate multiple beams to be used by the millimeter wave repeater 140 for relaying a reference signal that is received by the millimeter wave repeater 140 via a single beam. For example, as shown by reference number 810, the UE 120 may transmit a reference signal (e.g., an SRS, a RACH message, and/or the like) to the repeater 140 via a beam. As shown by reference number 815, the repeater 140 may transmit the received reference signal via multiple beams. In some aspects, the first set of resources and the second set of resources are over a same time interval, as described above in connection with FIG. 7. In some aspects, the first set of resources and the second set of resources are over a same frequency band, as described above in connection with FIG. 7. In some aspects, the first set of resources and the second set of resources have a same bandwidth size with different frequencies, as described above in connection with FIG. 7.

In some aspects, the resource set indicated in the configuration is configured for beam management for an indirect link (e.g., via the repeater 140) between the base station 110 and one of a first node or a second node (e.g., between the base station 110 and the UE 120 in example 700). In some aspects, the configuration may further indicate another resource set configured for beam management for a direct link (e.g., without using a repeater 140 as an intermediary) between the base station 110 and one of the first node or the second node (e.g., between the base station 110 and the UE 120 in example 700). Additional details regarding using separate resource sets for direct links versus indirect links are described below in connection with FIG. 9.

As shown by reference number 820, the base station 110 may identify a first beam pair and a second beam pair based at least in part on transmitting the configuration. As shown by reference number 825, the first beam pair may be between the millimeter wave repeater 140 and the first node (e.g., the UE 120 in example 800). As shown by reference number 830, the second beam pair may be between the millimeter wave repeater 140 and the second node (e.g., the base station 110 in example 800). The base station 110 may identify the first beam pair and the second beam pair based at least in part on one or more reference signals transmitted, received, and/or relayed in accordance with the configuration, as described in more detail below.

In example 800, the UE 120 may transmit one or more uplink reference signals (e.g., one or more SRSs, one or more RACH messages, and/or the like) to the repeater 140 via corresponding one or more beams (e.g., using one beam for each uplink reference signal) according to the configuration. For each uplink reference signal received via a beam (e.g., via an Rx beam of the repeater 140), the repeater 140 may relay that uplink reference signal via multiple beams (e.g., multiple Tx beams of the repeater) according to the configuration, as shown. In some aspects, the configuration may indicate a correspondence between an Rx resource (e.g., a time resource, a frequency resource, a beam, and/or the like) via which the uplink reference signal is received by the repeater 140 and a set of Tx resources (e.g., a set of time resources, a set of frequency resources, a set of beams, and/or the like) via which the uplink reference signal is to be relayed by the repeater 140. Thus, the repeater 140 may receive a signal via a first resource and may relay the signal via one or more second resources (that correspond to the first resource) according to the configuration.

In some aspects, the UE 120 may transmit the one or more uplink reference signals based at least in part on an instruction received from the base station 110 (e.g., via the repeater 140) according to the configuration. For example, the base station 110 may transmit an instruction for the first node (e.g., the UE 120 in example 800) to transmit the one or more uplink reference signals. In some aspects, the instruction may be included in the configuration, which may be relayed by the repeater 140 to the UE 120. In some aspects, the instruction may indicate a set of resources to be used by the UE 120 to transmit the reference signals. For example, the set of resources may be the first set of resources (e.g., the time resources, frequency resources, and/or beams used by the repeater 140 to receive the reference signals). Although uplink reference signals are used as an example, if the first node is a first base station 110 and the second node is a second base station 110, then downlink reference signals may be used (e.g., SSBs, CSI-RSs, and/or the like). Additionally, or alternatively, a wideband beacon may be used (e.g., if multiple repeaters 140 are used as intermediaries between the nodes).

The base station 110 may identify the first beam pair and the second beam pair based at least in part on measuring the one or more uplink reference signals. For example, a measurement by the base station 110 in a resource may correspond to a reference signal transmitted by the UE 120 to the repeater 140 via a first beam pair and relayed by the repeater 140 to the base station 110 via a second beam pair. Thus, by identifying a resource corresponding to the best measurement (e.g., among multiple measurements performed by the base station 110), the base station 110 may identify the best combination of a backhaul beam pair (e.g., the first beam pair) and an access beam (e.g., the second beam pair). In some aspects, the base station 110 may configure the repeater 140 and/or the UE 120 with a set of beams (e.g., an Rx beam and/or a Tx beam) based at least in part on identifying the first beam pair and the second beam pair, as described above in connection with FIG. 7. In some aspects, the base station 110 may perform a random access channel (RACH) procedure (e.g., with the UE 120) using the first beam pair and the second beam pair (e.g., by transmitting and/or receiving a RACH message via the first beam pair and the second beam pair). For example, the base station 110 may exchange RACH messages with a UE 120, where the RACH messages are relayed by the millimeter wave repeater 140 using the first beam pair (e.g., for one of Rx or Tx) and the second beam pair (e.g., for the other of Rx or Tx).

FIG. 7 and FIG. 8 show examples of a base station 110 transmitting a configuration that assists with identifying a first beam pair and a second beam pair where one of the beam pairs is between the base station 110 and the repeater 140. However, in some aspects, the base station 110 may transmit a configuration that assists with identifying a first beam pair and a second beam pair where neither of the beam pairs is between the base station 110 and the repeater 140.

For example, the base station 110 may transmit a configuration that assists with identifying a first beam pair between a first node (that is not the base station 110) and the repeater 140, and a second beam pair between a second node (that is not the base station 110) and the repeater 140, in a similar manner as described in connection with FIG. 7 and FIG. 8. For example, the first node may be a first UE 120 and the second node may be a second UE 120. In this case, the base station 110 may transmit an instruction for the first node to transmit one or more reference signals (e.g., via the first set of resources) and may transmit an instruction to the second node to measure the one or more reference signals (e.g., via the second set of resources). In some aspects, the base station 110 may receive a report of the measurements (e.g., a measurement report described herein) from the second node. For example, the base station 110 may configure the second node to transmit a measurement report to the base station 110 (e.g., using a reporting configuration). The base station 110 may identify the first beam pair and the second beam pair based at least in part on the measurement report. In some aspects, the base station 110 may transmit an indication of the first beam pair and/or the second beam pair to the first node, the second node, and/or the repeater 140 to assist with beam management.

Alternatively, in some aspects, the base station 110 may be both the first node and the second node. In this case, the base station 110 may transmit a configuration that assists with identifying a first beam pair and a second beam pair where both of the beam pairs are between the base station 110 and the repeater 140. This configuration may be used, for example, for a random access procedure and/or another procedure when a connection between the base station 110 and the UE 120 has not yet been established. In this case, the base station 110 may transmit one or more reference signals (e.g., SSBs and/or the like) to the repeater 140 via the first set of resources. The repeater 140 may relay the reference signal(s), and a UE 120 may transmit a RACH message (e.g., a RACH preamble and/or the like) based at least in part on receiving a reference signal. The UE 120 may transmit the RACH message to the repeater 140, and the repeater 140 may relay the RACH message using the second set of resources. The base station 110 may scan (e.g., monitor) the second set of resources for RACH messages. Based at least in part on this scanning, the base station 110 may receive a RACH message and may determine a first beam pair and a second beam pair for communicating with a node that transmitted the RACH message.

In some aspects, the repeater 140 may transmit, to the base station 110, a report regarding a power setting or a measured receive (Rx) power of the repeater 140, in a similar manner as described above in connection with FIG. 7. Additionally, or alternatively, the base station 110 may transmit another configuration that indicates another resource set to be used by the repeater 140 for refined beam management, in a similar manner as described above in connection with FIG. 8.

As indicated above, FIG. 8 is provided as an example. Other examples may differ from what is described with regard to FIG. 8.

Figure 9:
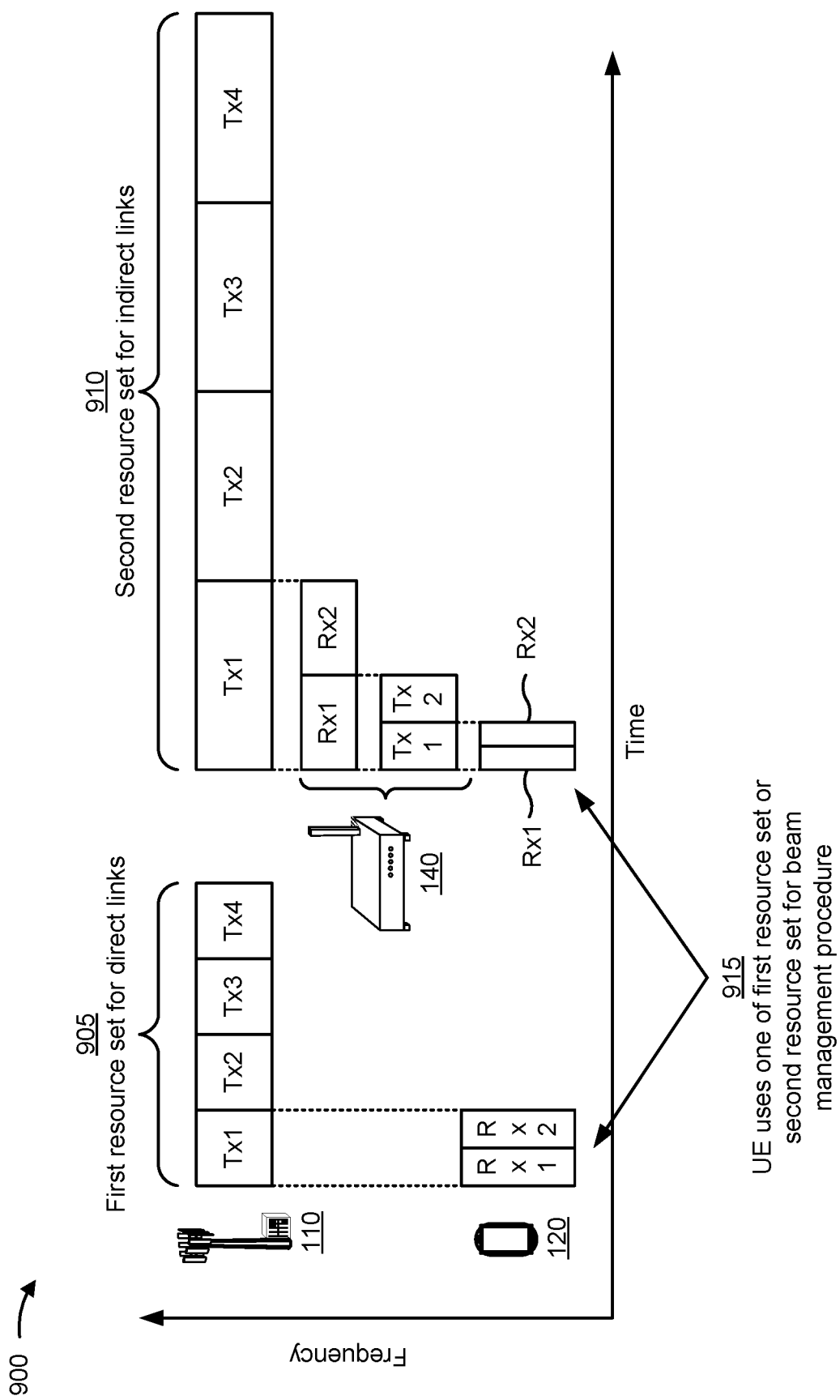

FIG. 9 is a diagram illustrating another example 900 of joint beam management for backhaul links and access links, in accordance with various aspects of the present disclosure.

As shown in FIG. 9, in some aspects, a base station 110 may configure different resource sets for direct links and indirect links to be used for beam management. For example, the base station 110 may transmit a configuration that indicates a first resource set and a second resource set for beam management. The configuration may be received by a node, such as a UE 120, another base station 110, and/or the like (shown as a UE 120 in example 900). As shown by reference number 905, the first resource set (e.g., a first set of time resources, frequency resources, beams, and/or the like) may be configured for beam management for a direct link between the node (e.g., the UE 120) and the base station 110. As shown by reference number 910, the second resource set (e.g., a second set of time resources, frequency resources, beams, and/or the like) may be configured for beam management for an indirect link between the node (e.g., the UE 120) and the base station 110 via a millimeter wave repeater 140. In some aspects, the configuration may be transmitted and/or received in system information (e.g., in a master information block (MIB), in one or more system information blocks (SIBs), in a physical broadcast channel (PBCH), in remaining minimum system information (RMSI), and/or the like), in a radio resource control (RRC) message (e.g., in an RRC configuration message, an RRC reconfiguration message, and/or the like), and/or the like.

In some aspects, the first resource set and the second resource set may be orthogonal with one another (e.g., may be non-overlapping). Additionally, or alternatively, the second resource set may include more resources than the first resource set. For example, the first resource set may include resources for transmission of reference signals by the base station 110 and reception of the reference signals by the UE 120, while the second resource set may include resources for transmission of reference signals by the base station 110 and reception of the reference signals by the repeater 140 (e.g., using one beam per reference signal) as well as resources for relaying of the reference signals (e.g., on multiple beams per reference signal) by the repeater 140 and reception of the reference signals by the UE 120. Additionally, or alternatively, the second resource set may have a longer periodicity than the first resource set, as shown. This may permit each reference signal to be relayed via multiple beams prior to transmission of a next reference signal.

As shown by reference number 915, the UE 120 may use one of the first resource set or the second resource set for a beam management procedure. In some aspects, the UE 120 may determine whether the UE 120 is communicating with the base station 110 via a direct link or via an indirect link. If the UE 120 is communicating with the base station 110 via a direct link, then the UE 120 may use one or more resources of the first resource set to perform a beam management procedure. If the UE 120 is communicating with the base station 110 via an indirect link (e.g., via a repeater 140), then the UE 120 may use one or more resources of the second resource set to perform a beam management procedure. Similarly, the base station 110 may use the first resource set to perform a beam management procedure with a node (e.g., a first UE 120) that has a direct link with the base station, and/or may use the second resource set to perform a second beam management procedure with a node (e.g., a second UE 120) that has an indirect link with the base station via a millimeter wave repeater 140.

In some aspects, the base station 110 may perform a less complex beam management procedure for a direct link with the UE 120. For example, the base station 110 may not need to configure a repeater 140 to receive and relay messages via different beams, and the base station 110 may not need to repeat such messages so that the messages can be relayed by the repeater 140 using different Rx beams and/or Tx beams of the repeater 140. Conversely, the base station 110 may perform a more complex beam management procedure for an indirect link with the UE 120. For example, the base station 110 may need to configure the repeater 140 to receive and relay messages via different beams, and the base station 110 may need to repeat such messages so that the beam management messages can be relayed by the repeater 140 using different Rx beams and/or Tx beams of the repeater 140. Additionally, or alternatively, the base station 110 may instruct the repeater 140 to power down and/or to refrain from relaying messages for one or more resources used to communicate with the UE 120 when the UE 120 communicates directly with the base station 110. In this way, resources may be conserved and interference may be reduced.

As indicated above, FIG. 9 is provided as an example. Other examples may differ from what is described with regard to FIG. 9.

Figure 10:
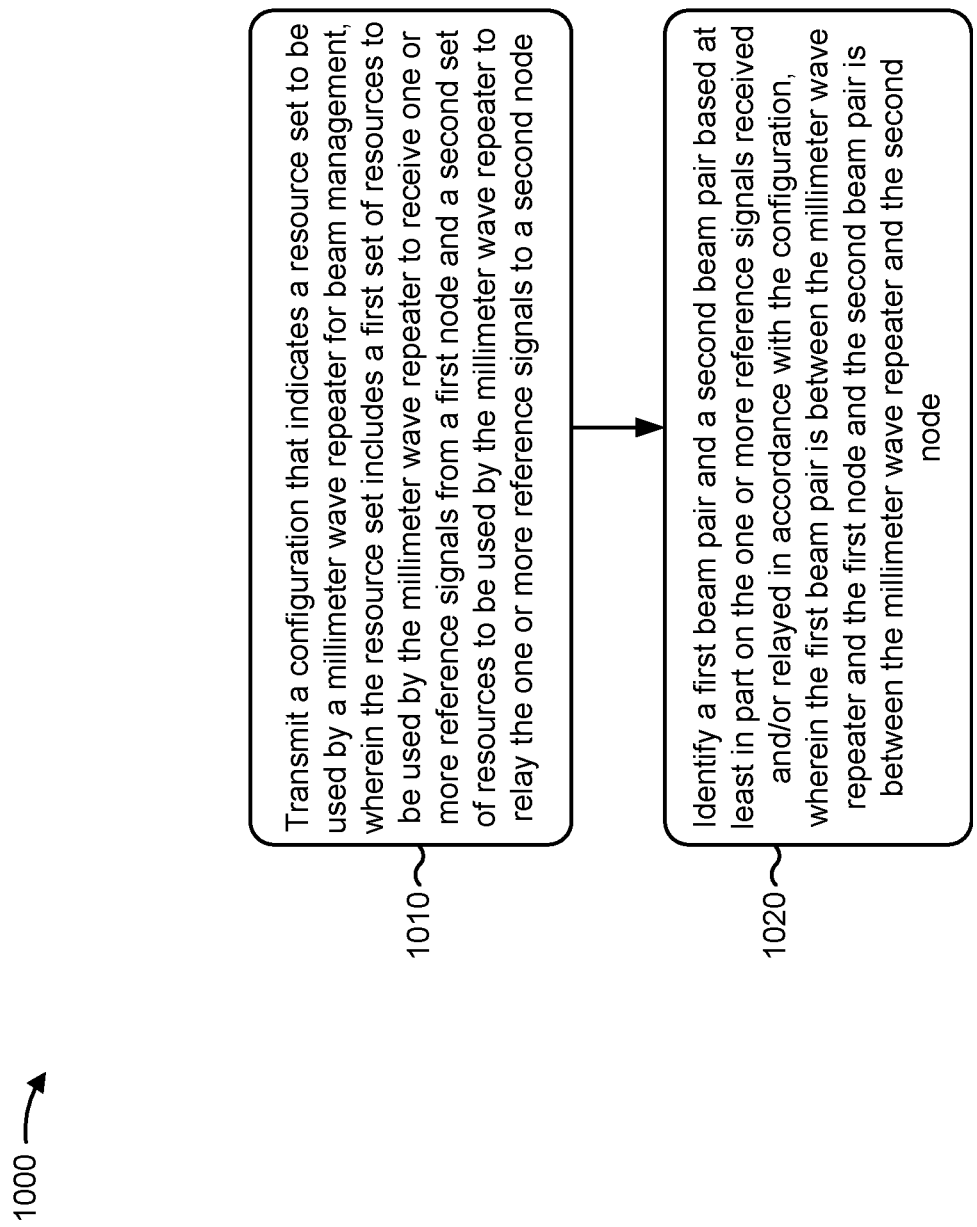
FIGS. 10-13 are diagrams illustrating example processes relating to joint beam management for backhaul links and access links, in accordance with various aspects of the present disclosure.

FIG. 10 is a diagram illustrating an example process 1000 performed, for example, by a base station, in accordance with various aspects of the present disclosure. Example process 1000 is an example where a base station (e.g., base station 110 and/or the like) performs operations associated with joint beam management for backhaul links and access links.

As shown in FIG. 10, in some aspects, process 1000 may include transmitting a configuration that indicates a resource set to be used by a millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node (block 1010). For example, the base station (e.g., using transmit processor 220, controller/processor 240, memory 242, and/or the like) may transmit a configuration that indicates a resource set to be used by a millimeter wave repeater for beam management, as described above in connection with FIGS. 7-9. In some aspects, the resource set includes a first set of resources to be used by the millimeter wave repeater to receive one or more reference signals from a first node and a second set of resources to be used by the millimeter wave repeater to relay the one or more reference signals to a second node.

As further shown in FIG. 10, in some aspects, process 1000 may include identifying a first beam pair and a second beam pair based at least in part on the one or more reference signals received and/or relayed in accordance with the configuration, wherein the first beam pair is between the millimeter wave repeater and the first node and the second beam pair is between the millimeter wave repeater and the second node (block 1020). For example, the base station (e.g., using transmit processor 220, receive processor 238, controller/processor 240, memory 242, and/or the like) may identify a first beam pair and a second beam pair based at least in part on transmitting the configuration, as described above in connection with FIGS. 7-9. In some aspects, the first beam pair is between the millimeter wave repeater and the first node and the second beam pair is between the millimeter wave repeater and the second node.

Process 1000 may include additional aspects, such as any single aspect or any combination of aspects described below and/or in connection with one or more other processes described elsewhere herein.

In a first aspect, the configuration indicates multiple beams to be used by the millimeter wave repeater for relaying a reference signal that is received by the millimeter wave repeater via a single beam.

In a second aspect, alone or in combination with the first aspect, the first set of resources and the second set of resources are over a same time interval.

In a third aspect, alone or in combination with one or more of the first and second aspects, the first set of resources and the second set of resources are over a same frequency band.

In a fourth aspect, alone or in combination with one or more of the first through third aspects, the first set of resources and the second set of resources have a same bandwidth size with different frequencies.

In a fifth aspect, alone or in combination with one or more of the first through fourth aspects, the configuration is transmitted via a control interface using a sub-6 gigahertz signal and the beam management is performed for a millimeter wave interface.

In a sixth aspect, alone or in combination with one or more of the first through fifth aspects, the first node is the base station and the one or more reference signals are one or more downlink reference signals transmitted by the base station to the second node via the millimeter wave repeater.

In a seventh aspect, alone or in combination with one or more of the first through sixth aspects, process 1000 includes transmitting an instruction for the second node to perform measurement and reporting of the one or more reference signals.

In an eighth aspect, alone or in combination with one or more of the first through seventh aspects, process 1000 includes receiving a measurement report from the second node based at least in part on transmitting the one or more downlink reference signals.

In a ninth aspect, alone or in combination with one or more of the first through eighth aspects, the first beam pair and the second beam pair are identified based at least in part on the measurement report.

In a tenth aspect, alone or in combination with one or more of the first through ninth aspects, the second node is the base station and the one or more reference signals are one or more uplink reference signals received by the base station from the first node via the millimeter wave repeater.

In an eleventh aspect, alone or in combination with one or more of the first through tenth aspects, process 1000 includes transmitting an instruction for the first node to transmit the one or more reference signals.

In a twelfth aspect, alone or in combination with one or more of the first through eleventh aspects, the first beam pair and the second beam pair are identified based at least in part on measuring the one or more reference signals.

In a thirteenth aspect, alone or in combination with one or more of the first through twelfth aspects, process 1000 includes transmitting an instruction to the first node to transmit the one or more reference signals and transmitting an instruction to the second node to measure the one or more reference signals.

In a fourteenth aspect, alone or in combination with one or more of the first through thirteenth aspects, process 1000 includes indicating at least one of the first beam pair or the second beam pair to at least one of the millimeter wave repeater, the first node, or the second node.

In a fifteenth aspect, alone or in combination with one or more of the first through fourteenth aspects, the first node is the base station and the second node is the base station, and the base station is configured to scan for random access channel preambles in the second set of resources.

In a sixteenth aspect, alone or in combination with one or more of the first through fifteenth aspects, process 1000 includes transmitting another configuration that indicates another resource set to be used by the millimeter wave repeater for refined beam management.

In a seventeenth aspect, alone or in combination with one or more of the first through sixteenth aspects, process 1000 includes transmitting, to the millimeter wave repeater, an indication of one or more beamforming configurations for configuring parameters of one or more beams to be used by the millimeter wave repeater to receive or relay communications.

In an eighteenth aspect, alone or in combination with one or more of the first through seventeenth aspects, process 1000 includes receiving, from the millimeter wave repeater, a report regarding a power setting or a measured receive power of the millimeter wave repeater.

In a nineteenth aspect, alone or in combination with one or more of the first through eighteenth aspects, the resource set is configured for beam management for an indirect link between the base station and one of the first node or the second node via the millimeter wave repeater.

In a twentieth aspect, alone or in combination with one or more of the first through nineteenth aspects, the configuration further indicates another resource set configured for beam management for a direct link between the base station and one of the first node or the second node.

In a twenty-first aspect, alone or in combination with one or more of the first through twentieth aspects, process 1000 includes performing a random access channel (RACH) procedure based at least in part on identifying the first beam pair and the second beam pair. In one example, a base station may exchange RACH messages with a UE where the RACH messages are relayed by the millimeter wave repeater using the first beam pair and the second beam pair.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
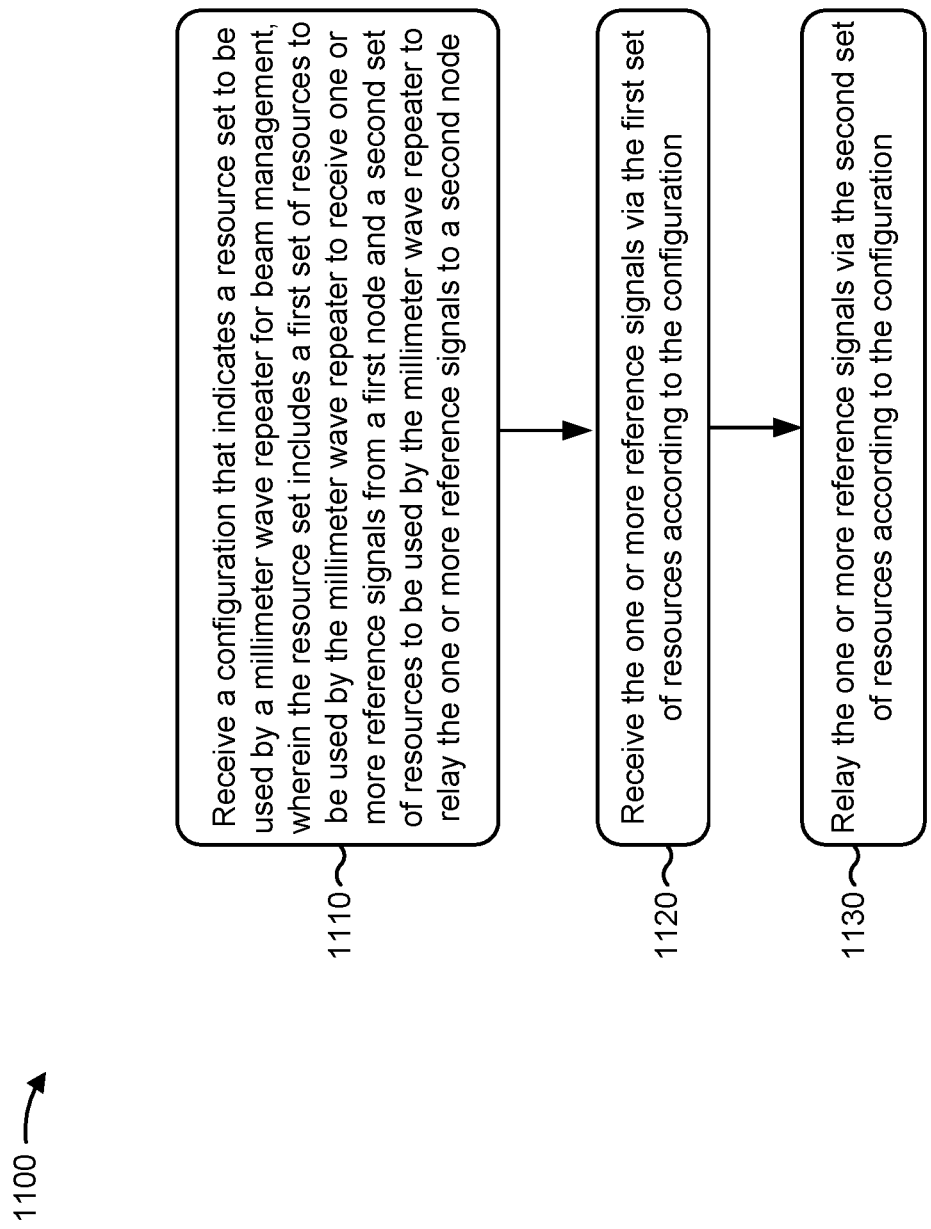

FIG. 11 is a diagram illustrating an example process 1100 performed, for example, by a repeater, in accordance with various aspects of the present disclosure. Example process 1100 is an example where a repeater (e.g., repeater 140 and/or the like) performs operations associated with joint beam management for backhaul links and access links.

As shown in FIG. 11, in some aspects, process 1100 may include receiving a configuration that indicates a resource set to be used by the millimeter wave repeater for beam management, wherein the resource set includes a first set of resources to be used by the millimeter wave repeater to receive one or more reference signals from a first node and a second set of resources to be used by the millimeter wave repeater to relay the one or more reference signals to a second node (block 1110). For example, the repeater (e.g., using antenna array 310, controller 330, communication component 340, and/or the like) may receive a configuration that indicates a resource set to be used by the millimeter wave repeater for beam management, as described above in connection with FIGS. 7-9. In some aspects, the resource set includes a first set of resources to be used by the millimeter wave repeater to receive one or more reference signals from a first node and a second set of resources to be used by the millimeter wave repeater to relay the one or more reference signals to a second node.

As further shown in FIG. 11, in some aspects, process 1100 may include receiving the one or more reference signals via the first set of resources according to the configuration (block 1120). For example, the repeater (e.g., using antenna array 310, controller 330, communication component 340, and/or the like) may receive the one or more reference signals via the first set of resources according to the configuration, as described above in connection with FIGS. 7-9.

As further shown in FIG. 11, in some aspects, process 1100 may include relaying the one or more reference signals via the second set of resources according to the configuration (block 1130). For example, the repeater (e.g., using antenna array 310, controller 330, communication component 340, and/or the like) may relay the one or more reference signals via the second set of resources according to the configuration, as described above in connection with FIGS. 7-9.

Process 1100 may include additional aspects, such as any single aspect or any combination of aspects described below and/or in connection with one or more other processes described elsewhere herein.

In a first aspect, the configuration indicates multiple beams to be used by the millimeter wave repeater for relaying a reference signal that is received by the millimeter wave repeater via a single beam.

In a second aspect, alone or in combination with the first aspect, the first set of resources and the second set of resources are over a same time interval.

In a third aspect, alone or in combination with one or more of the first and second aspects, the first set of resources and the second set of resources are over a same frequency band.

In a fourth aspect, alone or in combination with one or more of the first through third aspects, the first set of resources and the second set of resources have a same bandwidth size with different frequencies.

In a fifth aspect, alone or in combination with one or more of the first through fourth aspects, the configuration is received via a control interface and the beam management is performed for a millimeter wave interface.

In a sixth aspect, alone or in combination with one or more of the first through fifth aspects, process 1100 includes receiving another configuration that indicates another resource set to be used by the millimeter wave repeater for refined beam management.

In a seventh aspect, alone or in combination with one or more of the first through sixth aspects, process 1100 includes receiving an indication of one or more beamforming configurations to be used by the millimeter wave repeater to configure parameters of one or more beams used to receive or relay communications.

In an eighth aspect, alone or in combination with one or more of the first through seventh aspects, process 1100 includes transmitting a report regarding a power setting or a measured receive power of the millimeter wave repeater.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
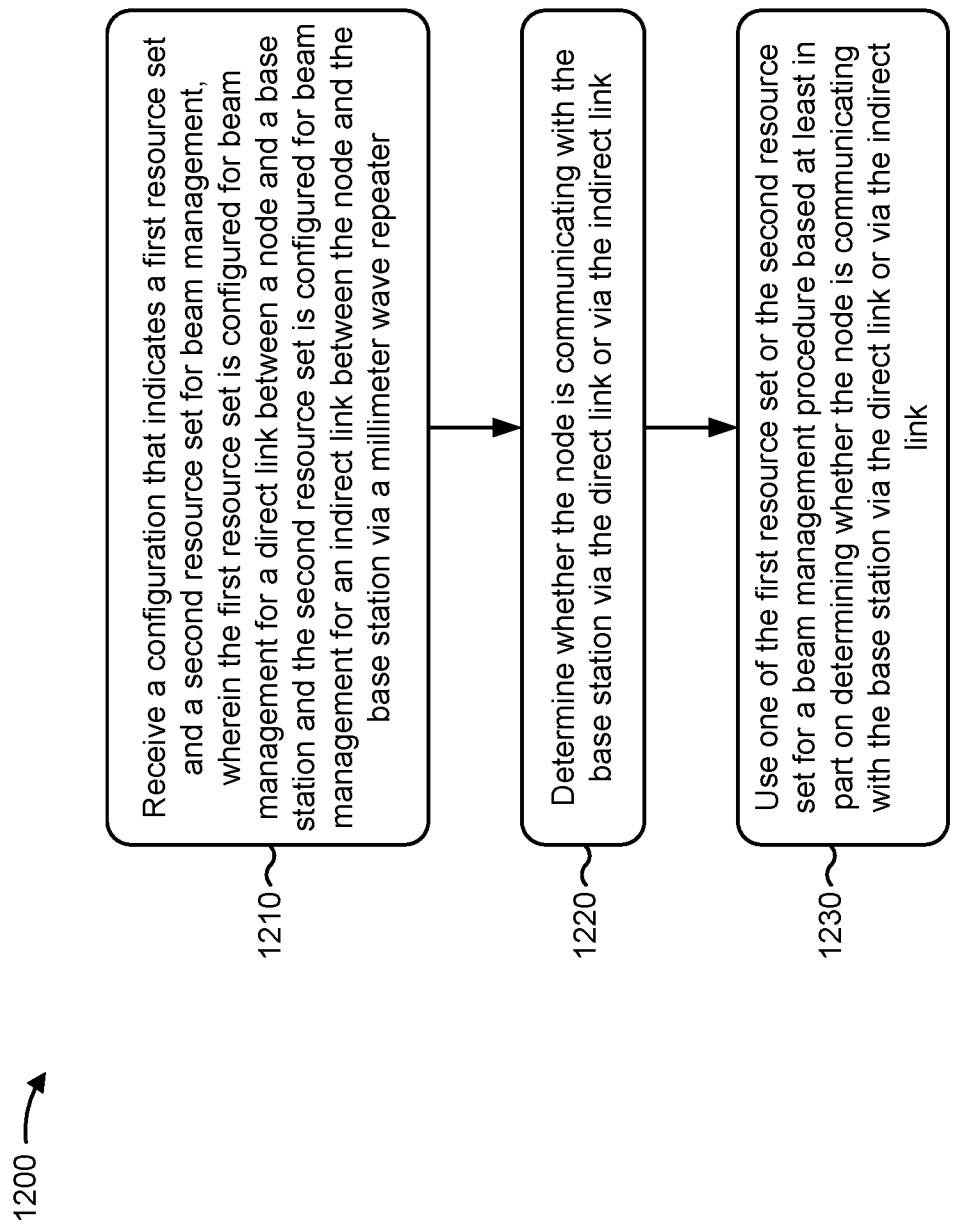

FIG. 12 is a diagram illustrating an example process 1200 performed, for example, by a node, in accordance with various aspects of the present disclosure. Example process 1200 is an example where a node (e.g., UE 120, base station 110, repeater 140, and/or the like) performs operations associated with joint beam management for backhaul links and access links.

As shown in FIG. 12, in some aspects, process 1200 may include receiving a configuration that indicates a first resource set and a second resource set for beam management, wherein the first resource set is configured for beam management for a direct link between the node and a base station and the second resource set is configured for beam management for an indirect link between the node and the base station via a millimeter wave repeater (block 1210). For example, the node (e.g., using receive processor 258, controller/processor 280, memory 282, and/or the like) may receive a configuration that indicates a first resource set and a second resource set for beam management, as described above in connection with FIGS. 7-9. In some aspects, the first resource set is configured for beam management for a direct link between the node and a base station and the second resource set is configured for beam management for an indirect link between the node and the base station via a millimeter wave repeater.

As further shown in FIG. 12, in some aspects, process 1200 may include determining whether the node is communicating with the base station via the direct link or via the indirect link (block 1220). For example, the node (e.g., using receive processor 258, controller/processor 280, memory 282, and/or the like) may determine whether the node is communicating with the base station via the direct link or via the indirect link, as described above in connection with FIGS. 7-9.

As further shown in FIG. 12, in some aspects, process 1200 may include using one of the first resource set or the second resource set for a beam management procedure based at least in part on determining whether the node is communicating with the base station via the direct link or via the indirect link (block 1230). For example, the node (e.g., using receive processor 258, transmit processor 264, controller/processor 280, memory 282, and/or the like) may use one of the first resource set or the second resource set for a beam management procedure based at least in part on determining whether the node is communicating with the base station via the direct link or via the indirect link, as described above in connection with FIGS. 7-9.

Process 1200 may include additional aspects, such as any single aspect or any combination of aspects described below and/or in connection with one or more other processes described elsewhere herein.

In a first aspect, the first resource set and the second resource set are orthogonal to one another.

In a second aspect, alone or in combination with the first aspect, the second resource set includes more resources than the first resource set.

In a third aspect, alone or in combination with one or more of the first and second aspects, the second resource set has a longer periodicity than the first resource set.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
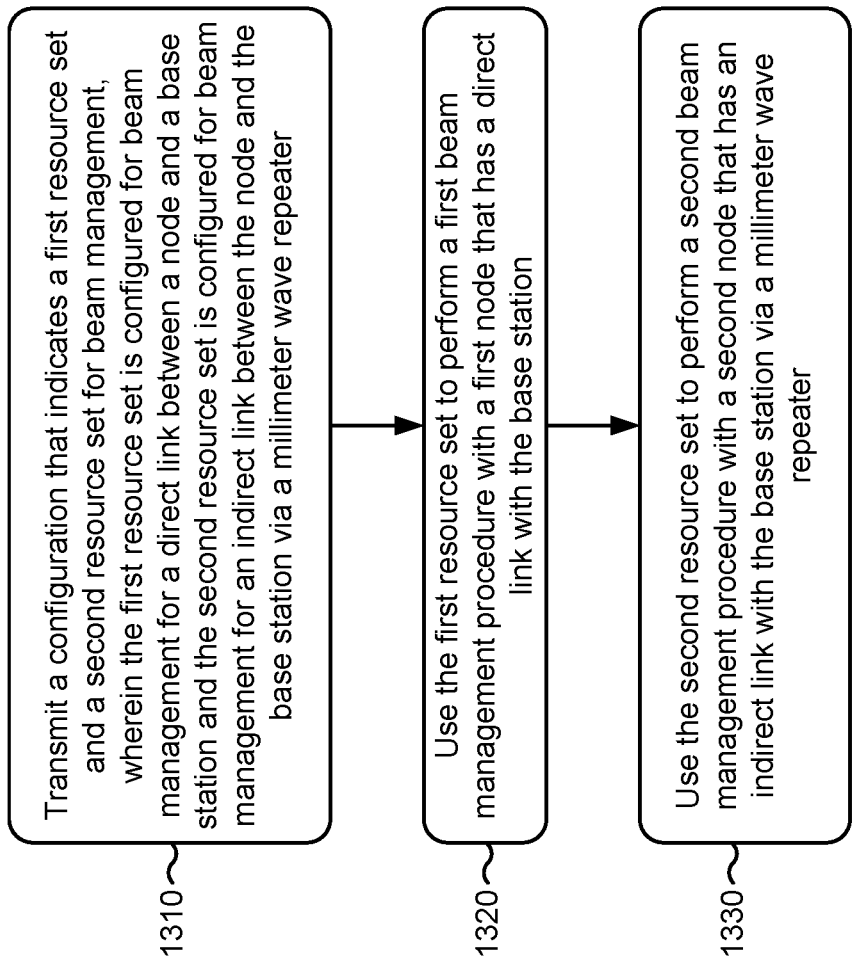

FIG. 13 is a diagram illustrating an example process 1300 performed, for example, by a base station, in accordance with various aspects of the present disclosure. Example process 1300 is an example where a base station (e.g., base station 110 and/or the like) performs operations associated with joint beam management for backhaul links and access links.

As shown in FIG. 13, in some aspects, process 1300 may include transmitting a configuration that indicates a first resource set and a second resource set for beam management, wherein the first resource set is configured for beam management for a direct link between a node and the base station and the second resource set is configured for beam management for an indirect link between the node and the base station via a millimeter wave repeater (block 1310). For example, the base station (e.g., using transmit processor 220, controller/processor 240, memory 242, and/or the like) may transmit a configuration that indicates a first resource set and a second resource set for beam management, as described above in connection with FIGS. 7-9. In some aspects, the first resource set is configured for beam management for a direct link between a node and the base station and the second resource set is configured for beam management for an indirect link between the node and the base station via a millimeter wave repeater.

As further shown in FIG. 13, in some aspects, process 1300 may include using the first resource set to perform a first beam management procedure with a first node that has a direct link with the base station (block 1320). For example, the base station (e.g., using transmit processor 220, receive processor 238, controller/processor 240, memory 242, and/or the like) may use the first resource set to perform a first beam management procedure with a first node that has a direct link with the base station, as described above in connection with FIGS. 7-9.

As further shown in FIG. 13, in some aspects, process 1300 may include using the second resource set to perform a second beam management procedure with a second node that has an indirect link with the base station via a millimeter wave repeater (block 1330). For example, the base station (e.g., using transmit processor 220, receive processor 238, controller/processor 240, memory 242, and/or the like) may use the second resource set to perform a second beam management procedure with a second node that has an indirect link with the base station via a millimeter wave repeater, as described above in connection with FIGS. 7-9.

Process 1300 may include additional aspects, such as any single aspect or any combination of aspects described below and/or in connection with one or more other processes described elsewhere herein.

In a first aspect, the first resource set and the second resource set are orthogonal to one another.

In a second aspect, alone or in combination with the first aspect, the second resource set includes more resources than the first resource set.

In a third aspect, alone or in combination with one or more of the first and second aspects, the second resource set has a longer periodicity than the first resource set.

In a fourth aspect, alone or in combination with one or more of the first through third aspects, the configuration is transmitted in system information or in a radio resource control message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:
   transmitting a configuration that indicates a resource set to be used by a millimeter wave repeater for beam management, wherein the resource set includes a first set of resources, to be used by the millimeter wave repeater to receive one or more reference signals from a first node via a single beam, and a second set of resources to be used by the millimeter wave repeater to relay the one or more reference signals to a second node via multiple beams; and
   identifying a first beam pair, associated with the single beam and for communication between the first node and the millimeter wave repeater, and a second beam pair, associated with the multiple beams and for communication between the second node and the millimeter wave repeater, based at least in part on transmitting the configuration.

2. The method of claim 1, wherein the first set of resources and the second set of resources are over a same time interval.

3. The method of claim 2, wherein the first set of resources and the second set of resources are over a same frequency band, have a same bandwidth size with different frequencies, or a combination thereof.

4. The method of claim 1, wherein the configuration is transmitted via a control interface using a sub-6 gigahertz signal and the beam management is performed for a millimeter wave interface.

5. The method of claim 1, wherein the first node is the network node and the one or more reference signals are one or more downlink reference signals transmitted by the network node to the second node via the millimeter wave repeater.

6. The method of claim 5, further comprising at least one of:
   transmitting an instruction for the second node to perform measurement and reporting of the one or more reference signals;
   receiving a measurement report from the second node based at least in part on transmitting the one or more downlink reference signals, wherein the first beam pair and the second beam pair are identified based at least in part on the measurement report; or
   a combination thereof.

7. The method of claim 1, wherein the second node is the network node and the one or more reference signals are one or more uplink reference signals received by the network node from the first node via the millimeter wave repeater.

8. The method of claim 7, further comprising transmitting an instruction for the first node to transmit the one or more reference signals.

9. The method of claim 7, wherein the first beam pair and the second beam pair are identified based at least in part on measuring the one or more reference signals.

10. The method of claim 1, further comprising at least one of:
    transmitting an instruction to the first node to transmit the one or more reference signals and transmitting an instruction to the second node to measure the one or more reference signals;
    indicating at least one of the first beam pair or the second beam pair to at least one of the millimeter wave repeater, the first node, or the second node; or
    a combination thereof.

11. The method of claim 1, wherein the first node is the network node and the second node is a user equipment, wherein the method further comprises: scanning for random access channel preambles in the second set of resources, and wherein identifying a first beam pair and a second beam pair is based on scanning for random access channel preambles in the second set of resources.

12. The method of claim 1, further comprising at least one of:
    transmitting another configuration that indicates another resource set to be used by the millimeter wave repeater for refined beam management;
    transmitting, to the millimeter wave repeater, an indication of one or more beamforming configurations for configuring parameters of one or more beams to be used by the millimeter wave repeater to receive or relay communications;
    receiving, from the millimeter wave repeater, a report regarding a power setting or a measured receive power of the millimeter wave repeater; or
    a combination thereof.

13. The method of claim 1, wherein the resource set is configured for beam management for an indirect link between the network node and one of the first node or the second node via the millimeter wave repeater, wherein the configuration further indicates another resource set configured for beam management for a direct link between the network node and one of the first node or the second node.

14. The method of claim 1, further comprising performing a random access channel (RACH) procedure based at least in part on identifying the first beam pair and the second beam pair.

15. A method of wireless communication performed by a millimeter wave repeater, comprising:
    receiving, from a first node, a configuration that indicates a resource set to be used by the millimeter wave repeater for beam management, wherein the resource set includes a first set of resources to be used by the millimeter wave repeater to receive one or more reference signals from the first node via a single beam and a second set of resources to be used by the millimeter wave repeater to relay the one or more reference signals to a second node via multiple beams;
    receiving the one or more reference signals via the first set of resources according to the configuration; and
    relaying the one or more reference signals via the second set of resources according to the configuration.

16. The method of claim 15, wherein the first set of resources and the second set of resources are over a same time interval.

17. The method of claim 16, wherein the first set of resources and the second set of resources are over a same frequency band, have a same bandwidth size with different frequencies, or a combination thereof.

18. The method of claim 15, wherein the configuration is received via a control interface and the beam management is performed for a millimeter wave interface.

19. The method of claim 15, further comprising receiving another configuration that indicates another resource set to be used by the millimeter wave repeater for refined beam management.

20. The method of claim 15, further comprising receiving an indication of one or more beamforming configurations to be used by the millimeter wave repeater to configure parameters of one or more beams used to receive or relay communications.

21. The method of claim 15, further comprising transmitting a report regarding a power setting or a measured receive power of the millimeter wave repeater.

22. A method of wireless communication performed by a user equipment, comprising:
   receiving, from a network node, a configuration that indicates a first resource set and a second resource set for beam management, wherein:
      the first resource set is configured for beam management for a direct link between the user equipment and the network node and includes first resources for transmission of reference signals by the network node and reception of the reference signals by the user equipment, and
      the second resource set is configured for beam management for an indirect link between the user equipment and the network node via a millimeter wave repeater and includes:
         second resources for transmission of the reference signals by the network node and reception of the reference signals by millimeter wave repeater, and
         third resources for relaying of the reference signals by the millimeter wave repeater and reception of the reference signals by the user equipment;
   determining whether the user equipment is communicating with the network node via the direct link or via the indirect link; and
   using one of the first resource set or the second resource set for a beam management procedure based at least in part on determining whether the user equipment is communicating with the network node via the direct link or via the indirect link.

23. The method of claim 22, wherein the first resource set and the second resource set are orthogonal to one another.

24. The method of claim 22, wherein the second resource set includes more resources than the first resource set.

25. The method of claim 22, wherein the second resource set has a longer periodicity than the first resource set.

26. A method of wireless communication performed by a network node, comprising:
   transmitting, to a millimeter wave repeater, a configuration, that indicates a first resource set and a second resource set for beam management, wherein the first resource set is configured for beam management for a direct link between a first user equipment and the network node, and wherein the second resource set is configured for beam management for an indirect link between a second user equipment and the network node via the millimeter wave repeater;
   performing, using the first resource set, a first beam management procedure with the first user equipment that has a direct link with the network node; and
   performing, using the second resource set, a second beam management procedure with the second user equipment that has an indirect link with the network node via the millimeter wave repeater.

27. The method of claim 26, wherein the first resource set and the second resource set are orthogonal to one another.

28. The method of claim 26, wherein the second resource set includes more resources than the first resource set, has a longer periodicity than the first resource set, or a combination thereof.

29. The method of claim 26, wherein the configuration is transmitted in system information or in a radio resource control message.

30. The method of claim 26, wherein the first beam management procedure includes, and the second beam management procedure does not include, configuring the millimeter wave repeater to receive and relay one or more messages via different beams.

* * * * *